United States Patent
Saito

(10) Patent No.: US 8,599,451 B2
(45) Date of Patent: Dec. 3, 2013

(54) SHEET CONVEYANCE DEVICE, IMAGE READING APPARATUS AND IMAGE FORMING APPARATUS USING SHEET CONVEYANCE DEVICE

(75) Inventor: Hiroshi Saito, Kashiwa (JP)

(73) Assignee: Canon Kabushiki Kaisha (JP)

( * ) Notice: Subject to any disclaimer, the term of this patent is extended or adjusted under 35 U.S.C. 154(b) by 100 days.

(21) Appl. No.: 13/369,132

(22) Filed: Feb. 8, 2012

(65) Prior Publication Data

US 2012/0262765 A1    Oct. 18, 2012

(30) Foreign Application Priority Data

Feb. 10, 2011 (JP) ................................. 2011-027151
Jan. 30, 2012 (JP) ................................. 2012-016618

(51) Int. Cl.
*H04N 1/04* (2006.01)
(52) U.S. Cl.
USPC ........... 358/498; 358/474; 358/496; 358/465; 271/227; 271/270; 399/395; 399/361
(58) Field of Classification Search
USPC .......... 358/498, 474, 504, 496, 1.2, 488, 449, 358/528, 465, 486; 271/227, 270, 297, 228, 271/265.01; 399/395, 361, 401
See application file for complete search history.

(56) References Cited

U.S. PATENT DOCUMENTS

| | | | | | |
|---|---|---|---|---|---|
| 5,327,205 | A | * | 7/1994 | Baba | 399/370 |
| 5,442,431 | A | * | 8/1995 | Fujimoto et al. | 399/367 |
| 5,444,506 | A | * | 8/1995 | Nakazawa et al. | 353/104 |
| 5,854,965 | A | * | 12/1998 | Kasiwabara et al. | 399/381 |
| 5,983,049 | A | * | 11/1999 | Matsuya et al. | 399/68 |
| 7,224,932 | B2 | * | 5/2007 | Omata | 399/400 |
| 7,386,270 | B2 | * | 6/2008 | Moteki | 399/406 |
| 7,398,027 | B2 | * | 7/2008 | Koshida et al. | 399/68 |
| 7,427,259 | B2 | * | 9/2008 | Matsushita | 493/444 |
| 7,938,399 | B2 | * | 5/2011 | Kawaguchi | 271/227 |
| 7,984,905 | B2 | * | 7/2011 | Yasumoto | 271/265.02 |
| 8,348,265 | B2 | * | 1/2013 | Isogai | 271/242 |
| 2012/0187622 | A1 | * | 7/2012 | Kamichi | 271/171 |

FOREIGN PATENT DOCUMENTS

JP    04-277151 A    10/1992
JP    2003-146485 A    5/2003

* cited by examiner

*Primary Examiner* — Negussie Worku

(74) *Attorney, Agent, or Firm* — Rossi, Kimms & McDowell LLP

(57) ABSTRACT

A sheet conveyance device that is capable of correcting skew of a sheet like an index sheet without complicating a use setting and without increasing a cost significantly. A plurality of conveyance units are arranged in a direction intersecting a sheet conveyance direction to convey a sheet. At least three detection sensors are arranged in a direction intersecting the conveyance direction at an upstream side from the conveyance units to detect the sheet. A skew amount computation unit measures a time difference between detection timings of a front end of the sheet by two of the at least three detection sensors except the detection sensor that detects first, and computes a front-end skew amount according to the time difference. A speed change unit makes the conveyance speeds of the conveyance units be different according to the front-end skew amount so as to correct the skew of the sheet.

14 Claims, 20 Drawing Sheets

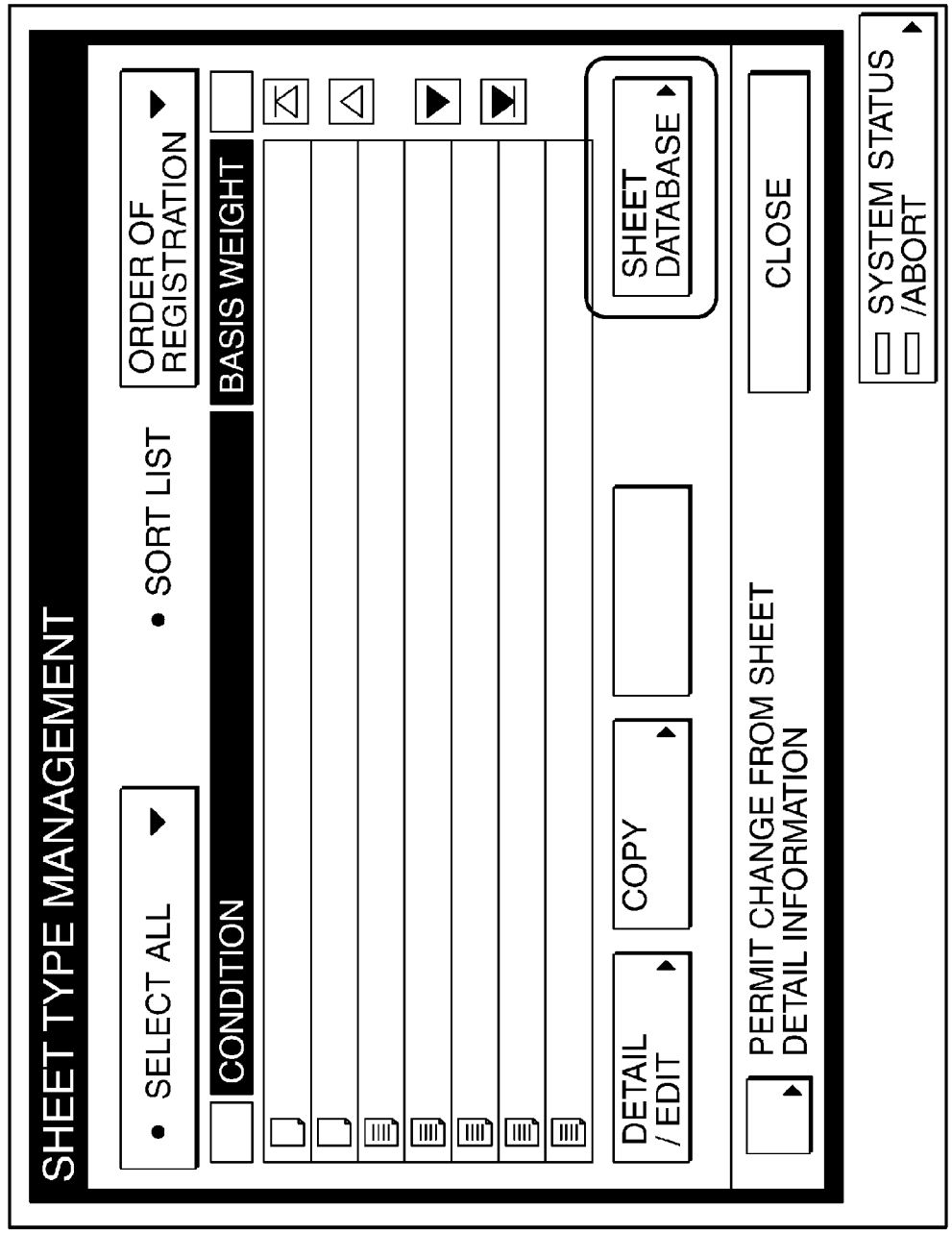

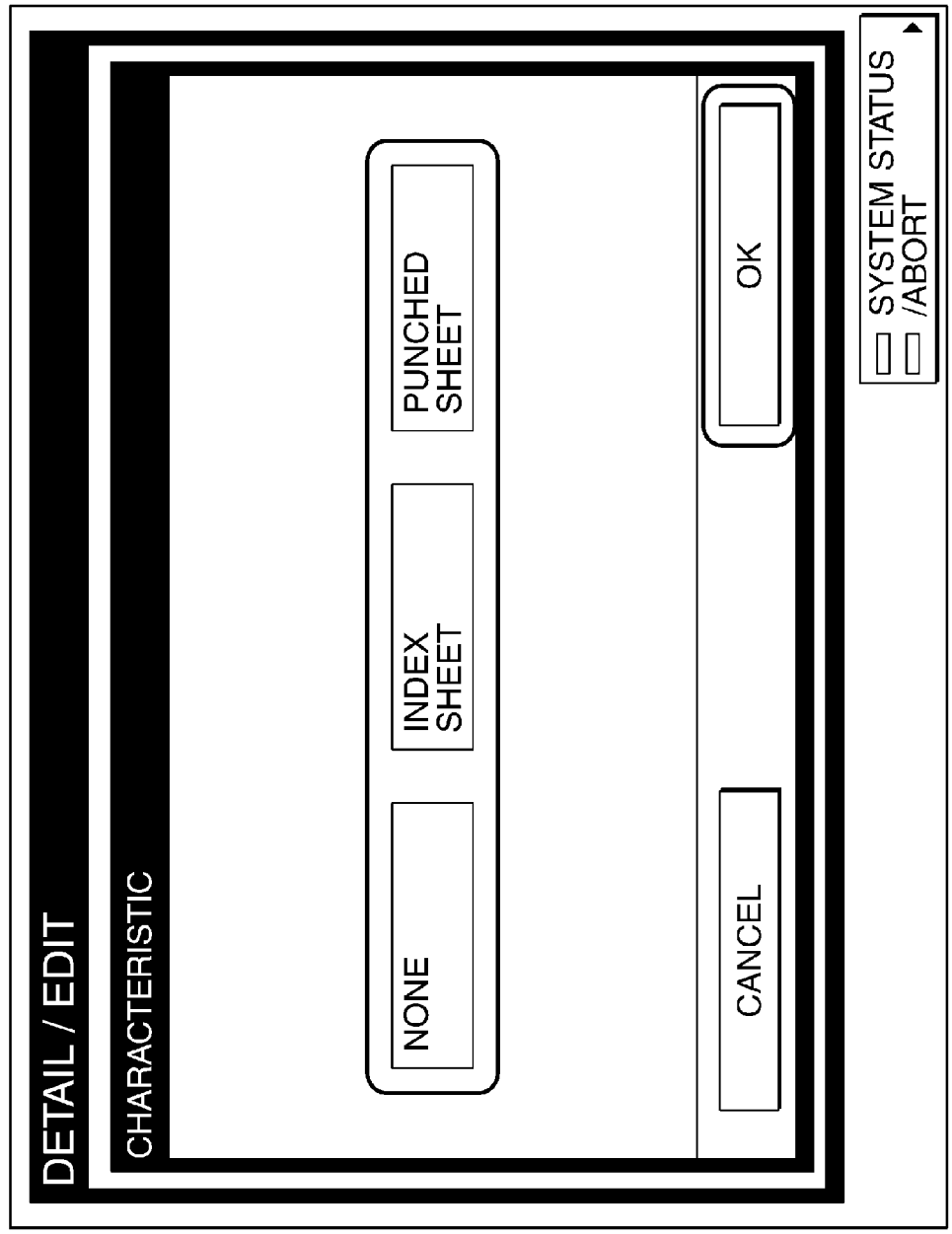

*FIG. 5D*
GENERATE INDEX SHEET : SETTING OF PRINT SHIFT WIDTH
PLEASE SET PRINT SHIFT WIDTH OF INDEX SHEET.
13 mm
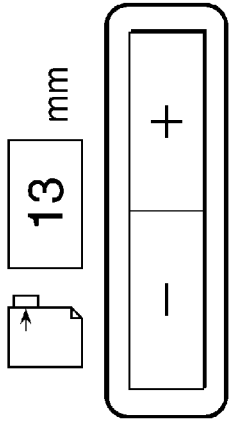
− +
 ▷ FIVE-WAY SPRIT
■ NUMBER OF PARTITIONS OF INDEX
| CANCEL SETTING | RETURN | OK |
☐ SYSTEM STATUS /ABORT

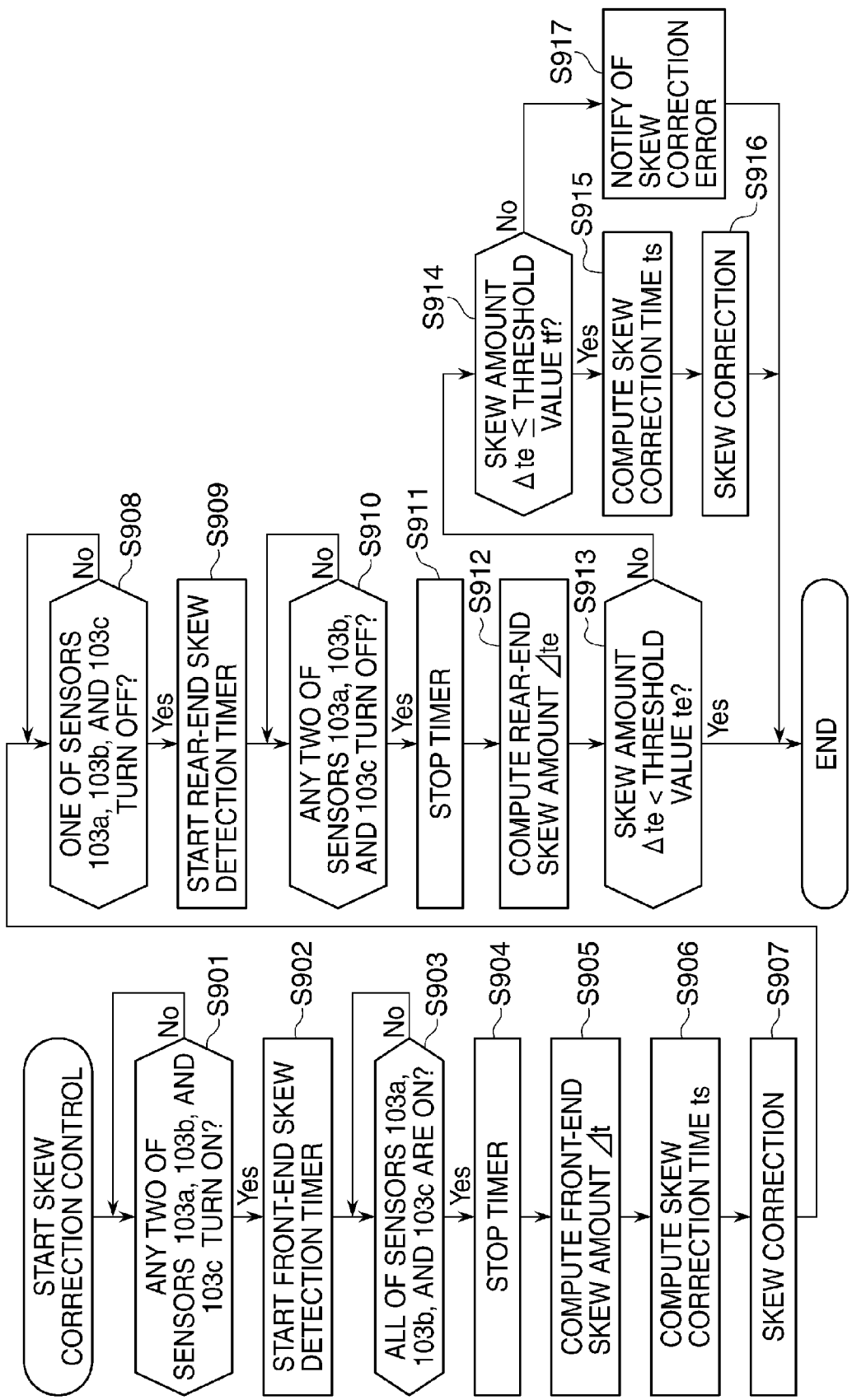

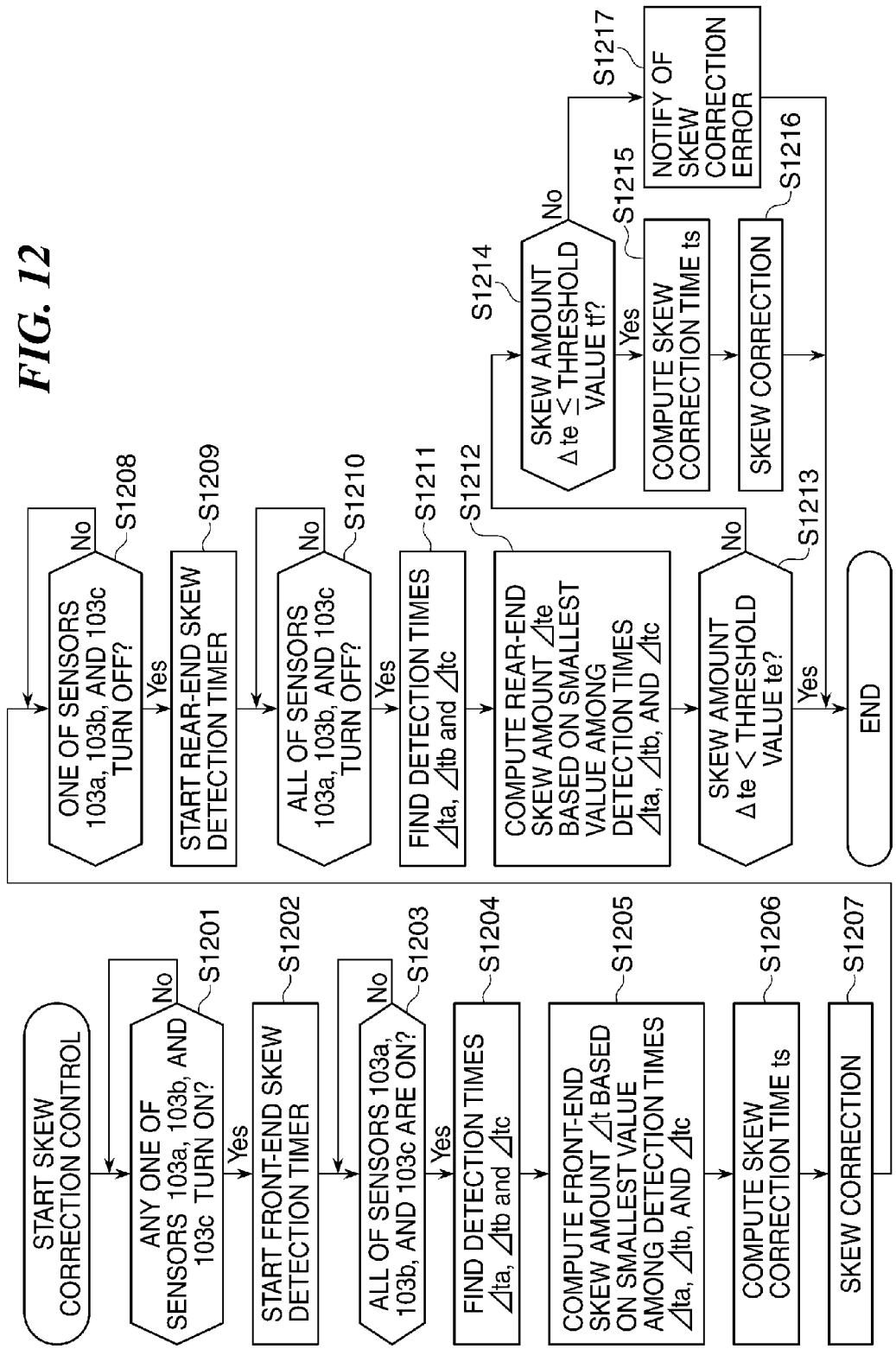

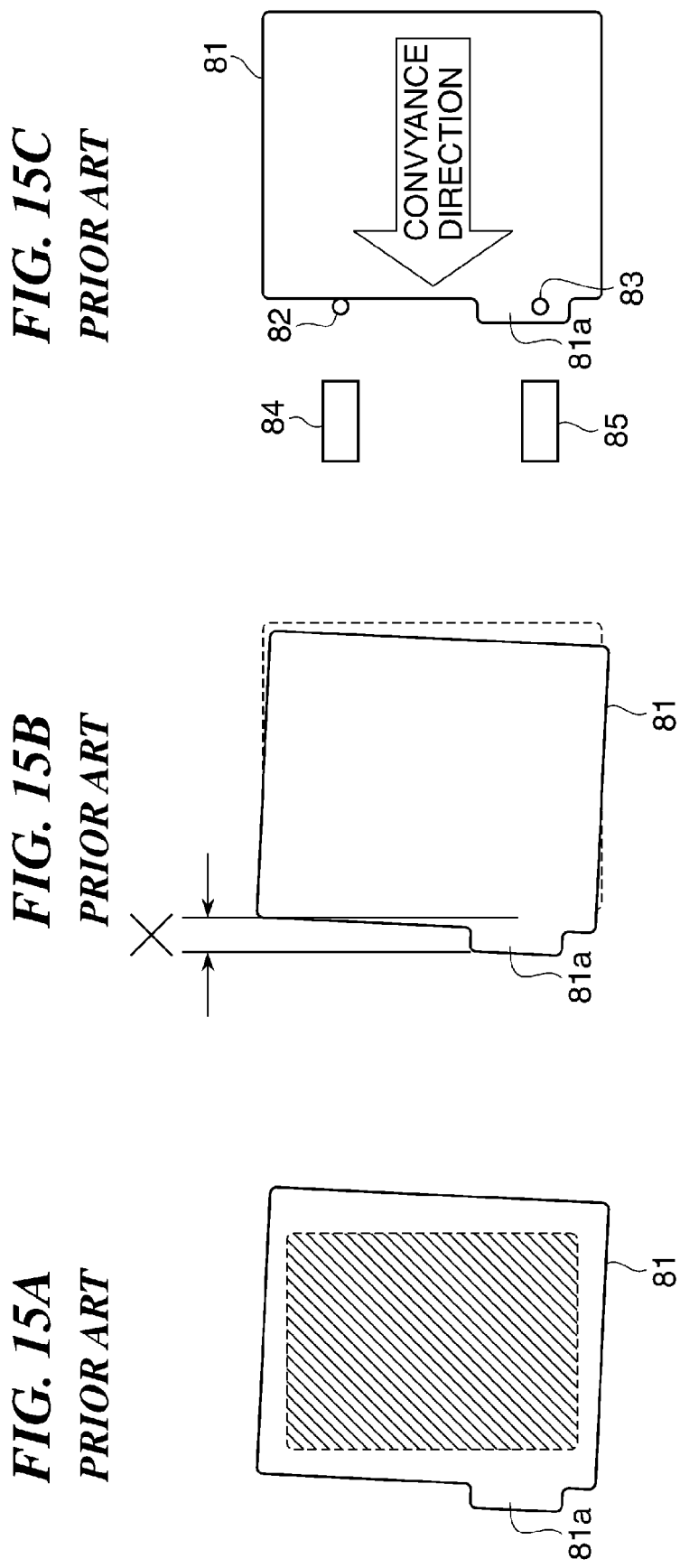

SHEET CONVEYANCE DEVICE, IMAGE READING APPARATUS AND IMAGE FORMING APPARATUS USING SHEET CONVEYANCE DEVICE

BACKGROUND OF THE INVENTION

1. Field of the Invention

The present invention relates to a sheet conveyance device that is equipped in an image forming apparatus like a printer or an image reading apparatus like a scanner, an image reading apparatus and an image forming apparatus that use the sheet conveyance device.

2. Description of the Related Art

Generally, an image forming apparatus such as a copier or a printer conveys a sheet to an image forming unit, and forms (prints) an image on the sheet. When the sheet is conveyed, the sheet may slant (skew) with respect to a sheet conveyance direction. Then, when the sheet skews, the image forming unit cannot print in high accuracy because a toner image is transferred to a deviated position of the sheet. Therefore, a conventional sheet conveyance device is provided with a skew correction mechanism for correcting the skew of sheet.

For example, Japanese Laid-Open Patent Publication (Kokai) No. H4-277151 (JP H4-277151A) discloses a skew correction mechanism of an active registration system that corrects the skew generated when a sheet is fed while conveying the sheet.

Incidentally, an image forming apparatus is required to form images on various types of sheets. For example, there is a demand for forming (printing) an image on a non-rectangular sheet such as an index sheet (it is also called a tab sheet). As shown in FIG. 15A, an index sheet 81 has an index part 81a in an edge side for filling in a title etc. for the purpose of classification. The technique disclosed in JP H4-277151A does not assume use of such a non-rectangular sheet.

Japanese Laid-Open Patent Publication (Kokai) No. 2003-146485 (JP 2003-146485A) discloses a skew correction mechanism as shown in FIG. 15C as a first embodiment. The disclosed skew correction mechanism is provided with skew detection sensors 82 and 83 arranged in a direction intersecting a conveyance direction of a sheet 81, conveying rollers 84 and 85, and a control unit (not shown) that independently controls conveyance speeds of the conveying rollers 84 and 85.

As shown in FIG. 15B, sheet configuration information that presents a dimension X of the index part 81a of the sheet 81 in the conveyance direction and position information that presents a position of the index part 81a in the index sheet are beforehand registered into a memory of the control unit.

An edge of the index sheet 81 is detected by the skew detection sensors 82 and 83. The control unit obtains the skew amount of the index sheet 81 according to the detection result concerned, the above-mentioned dimension X (the sheet configuration information), and the position information. Then, the skew of the index sheet is corrected by controlling the conveyance speeds of the conveying rollers 84 and 85 according to the skew amount.

However, there are several types of index sheets of which index parts are formed at different positions. That is, the index parts of the index sheets are shifted to one another so that a user can easily check titles etc. filled in the index parts when the index sheets are piled up.

In order to correct the skew of such an index sheet, it is necessary to know beforehand whether an index part will pass through the skew detection sensor. Therefore, since a user is required to set position and dimension of an index part to an image forming apparatus in addition to setting a sheet type (an index sheet or a regular sheet), the operation is complicated.

On the other hand, an apparatus in a second embodiment of Japanese Laid-Open Patent Publication (Kokai) No. 2003-146485 (JP 2003-146485A) is provided with a line sensor that consists of CCD's aligned in a width direction perpendicular to the sheet conveyance direction and detects an end shape and skew of a sheet by the line sensor. Then, the skew amount of the sheet is computed by processing an image of the end shape of the sheet detected by the line sensor, and the skew of the sheet is corrected in this embodiment.

Since the end shape of the sheet can be detected by using the line sensor, the user does not need to set the sheet shape beforehand, which reduces a user's load. However, the image processing by arranging the line sensor complicates the configuration and process of the apparatus and increases a cost significantly.

Such a problem also comes up in an image reading apparatus that corrects skew of an original.

SUMMARY OF THE INVENTION

The present invention provides a sheet conveyance device, an image reading apparatus and an image forming apparatus using the sheet conveyance device, which are capable of correcting skew of a sheet like an index sheet without complicating a setting by a user and without increasing a cost of the apparatus significantly.

Accordingly, a first aspect of the present invention provides a sheet conveyance device comprising a plurality of conveyance units configured to be arranged in a direction intersecting a sheet conveyance direction to convey a sheet (the conveyance units are driven independently), at least three detection sensors configured to be arranged in a direction intersecting the conveyance direction at an upstream side from the conveyance units to detect the sheet, a skew amount calculation unit configured to measure a time difference between detection timings of a front end of the sheet by two of the at least three detection sensors except the detection sensor that detects the front end of the sheet first as a front-end detection time, and to calculate a skew amount of the sheet as a front-end skew amount according to the front-end detection time, and a speed change unit configured to make the conveyance speeds of the conveyance units be different according to the front-end skew amount so as to correct the skew of the sheet.

Accordingly, a second aspect of the present invention provides a sheet conveyance device comprising a plurality of conveyance units configured to be arranged in a direction intersecting a sheet conveyance direction to convey a sheet, at least three detection sensors configured to be arranged in a direction intersecting the conveyance direction at an upstream side from the conveyance units to detect the sheet, a skew amount calculation unit configured to find a plurality of front-end detection times by measuring a time difference between detection timings of the front end of the sheet for every combination of two of the at least three detection sensors, to select the smallest detection time among the front-end detection times as a selected front-end detection time, and to calculate the skew amount based on the selected front-end detection time as a front-end skew amount, and a speed change unit configured to make the conveyance speeds of the conveyance units be different according to the front-end skew amount so as to correct the skew of the sheet.

Accordingly, a third aspect of the present invention provides an image reading apparatus comprising the sheet conveyance device according to the first or second aspect, an original tray on which an original as a sheet is arranged; and, a scanner configured to read an image of an original that is conveyed to an original reading position from the original tray by the sheet conveyance device in order to obtain image data.

Accordingly, a fourth aspect of the present invention provides an image forming apparatus comprising the sheet conveyance device according to the first or second aspect, a sheet storage in which a sheet is stored, a transfer unit configured to transfer a toner image, which is formed according to image data, onto the sheet conveyed to an image transfer position from the sheet storage by the sheet conveyance device.

According to the present invention, the skew of a sheet like an index sheet can be corrected by an easier setting by a user as compared with the prior art that detects skew by a pair of sensors at the lower cost as compared with the prior art that performs an image processing by using a line sensor.

Further features of the present invention will become apparent from the following description of exemplary embodiments with reference to the attached drawings.

BRIEF DESCRIPTION OF THE DRAWINGS

FIG. 4A is a view showing an example of a sheet list screen displayed on an operation-display unit shown in FIG. 1.

FIG. 4C is a view showing a selection screen displayed when a "CHANGE" button for a "CHARACTERISTIC" item in the sheet characteristic screen shown in FIG. 4B is pushed.

FIG. 5D is a view showing a print shift width selection screen for selecting a print shift width of an index sheet print.

FIG. 9 is a flowchart showing a skew detection-correction process that is performed by the skew correction unit shown in FIG. 1.

FIG. 12 is a flowchart showing a skew detection-correction process that is performed by the skew correction unit according to the second embodiment of the present invention.

FIG. 15A and FIG. 15B are views showing a shape of an index sheet.

FIG. 15C is a view showing an example of a conventional skew correction mechanism.

DESCRIPTION OF THE EMBODIMENTS

Hereafter, an example of a sheet conveyance device according to an embodiment of the present invention will be described with reference to the attached drawings.

Figure 1:
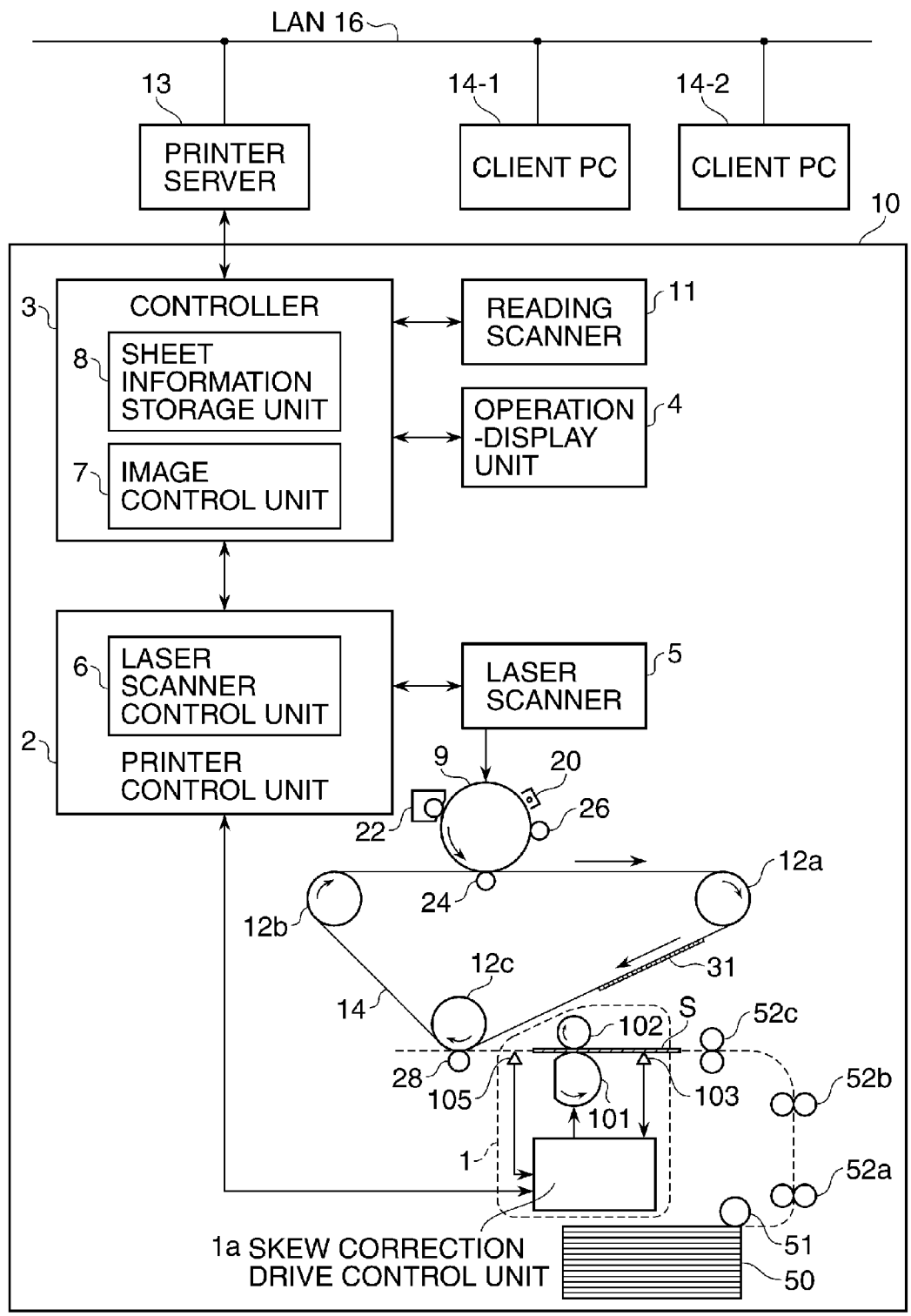
FIG. 1 is a view showing a main part of an image forming apparatus that is provided with a sheet conveyance device according to a first embodiment of the present invention, and a network system to which the image forming apparatus is connected.

FIG. 1 is a view showing a main part of an image forming apparatus 10 that is provided with a sheet conveyance device 1 according to a first embodiment of the present invention, and a network system to which the image forming apparatus 10 is connected.

The illustrated image forming apparatus 10 is provided with a printer control module 2 and a controller 3. In the illustrated example, a reading scanner 11 and an operation-display unit 4 are connected to the controller 3. Then, the controller 3 controls the operation-display unit 4 to display various kinds of information, and receives an operation command etc. inputted via the operation-display unit 4.

An image on an original read by the reading scanner 11 is given to the controller 3 as image data. The controller 3 is equipped with an image control unit 7 and a sheet information storage unit 8. The sheet information storage unit 8 stores sheet information mentioned later. The image control unit 7 controls the printer control unit 2 according to the above-mentioned image data.

The printer control unit 2 has a laser scanner control unit 6, which exposes a photosensitive drum 9 to a laser beam by driving and controlling a laser scanner 5 according to the image data, as described below.

It should be noted that the controller 3 is connected to a printer server 13 in the illustrated example. Then, the printer server 13 is connected to a client PC 14-1 and a client PC 14-2 via a LAN (local area network) 16. This enables the client PC 14-1 and the client PC 14-2 to print by sending image data to the printer server 13. That is, the controller 3 receives the image data from the printer server 13, and controls the printer control unit 2 according to the image data.

As shown in FIG. 1, an electrostatic charger 20, a development device 22, a primary transfer roller 24, and a cleaning roller 26 are arranged around the photosensitive drum 9. The surface of the photosensitive drum 9 is uniformly charged by the electrostatic charger 20. Then, as mentioned above, the laser scanner control unit 6 drives and controls the laser scanner 5 according to the image data so as to form an electrostatic latent image on the photosensitive drum 9. The electrostatic latent image on the photoconductive drum 9 is developed by the development device 22 and becomes a toner image. Then, the toner image is transferred to an intermediate transfer belt 14 by the primary transfer roller 24. Excess toner that remains on the photosensitive drum 9 is removed by the cleaning roller 26.

Although the illustrated example shows only one photosensitive drum 9, there are four photosensitive drums that correspond to four color toners of yellow (Y), cyan (C), magenta (M), and black (BK), in fact. Then, the toner images on the photosensitive drums are sequentially transferred to the intermediate transfer belt 14 so as to be stacked, and a color toner image is formed.

The intermediate transfer belt 14 is looped over a driving roller 12a, a driven roller 12b, and a tension roller 12c, and is rotated in a direction shown by a solid line arrow. A secondary transfer roller (transfer means) 28 is arranged opposite to the tension roller 12c. A secondary transfer position (image transfer position) is defined by a nip position between the tension roller 12c and the secondary transfer roller 28.

A sheet S is picked up by a pickup roller 51 from a sheet cassette (sheet storage) 50, and the sheet conveyance device conveys the sheet to the above-mentioned secondary transfer position. The sheet conveyance device is provided with conveying rollers 52a, 52b, and 52c, and has a skew correction unit 1 arranged at the downstream from the conveying roller 52c. The skew correction unit 1 corrects the skew of the sheet S that is conveyed along a conveyance path, and sends the sheet S to the secondary transfer position. In this case, the skew correction unit 1 adjusts the conveyance speed of the sheet S in order to synchronize the toner image (color toner image) on the intermediate transfer belt 14 with the sheet S. Then, the toner image on the intermediate transfer belt 14 is transferred to the sheet S at the secondary transfer position. Then, the sheet S is conveyed to a heat fixing unit (not shown), and the toner image is fixed by heat on the sheet S. Then, the sheet P is ejected to a sheet ejection tray (not shown).

It should be noted that the printer control unit 2 controls conveyance of a sheet and image formation as mentioned above.

Figure 2:
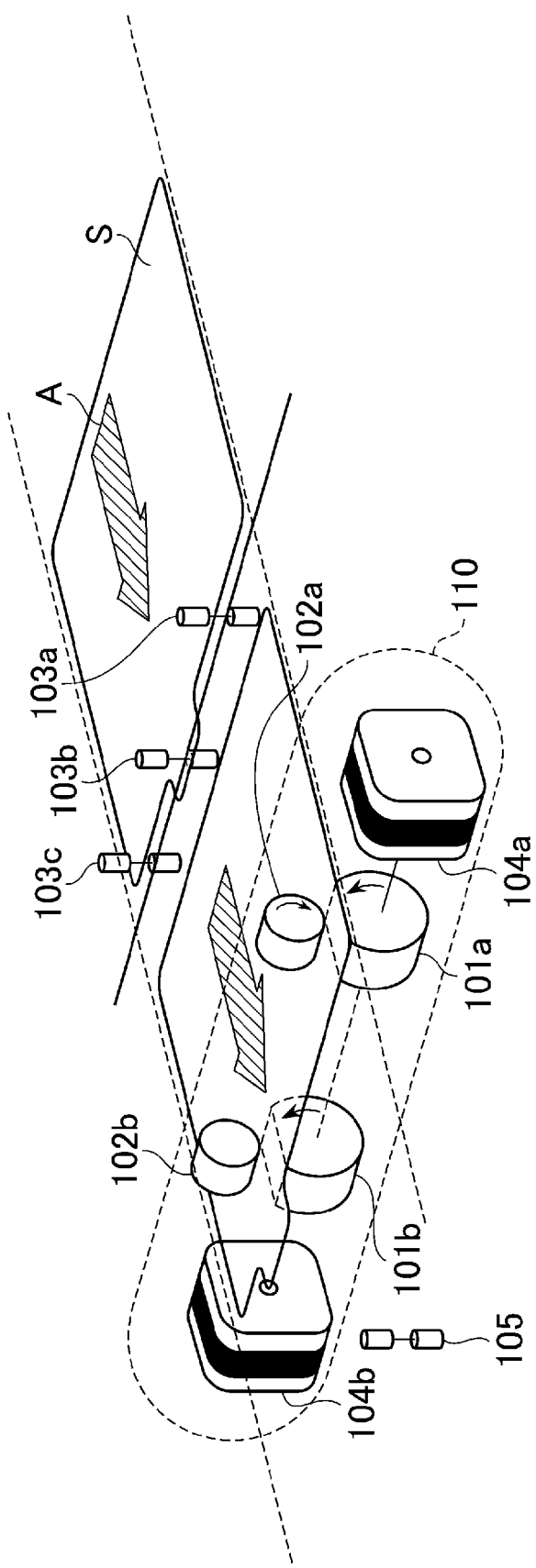
FIG. 2 is a perspective view showing a configuration of a skew correction unit shown in FIG. 1.

FIG. 2 is a perspective view showing a configuration of the skew correction unit 1 shown in FIG. 1.

The sheet S is conveyed along the conveyance path in a direction of an arrow A shown in FIG. 2. In the illustrated example, the skew correction unit 1 has a skew correction drive control unit 1a (FIG. 1), first, second, and third sheet detection sensors 103a, 103b, and 103c, and a skew correction operation unit 110. These sheet detection sensors 103a, 103b, and 103c are arranged in a direction intersecting (intersecting perpendicularly in this example) the arrow A at predetermined intervals (at regular intervals in this example).

In the illustrated example, each of the sheet detection sensors 103a, 103b, and 103c is a photosensor that has a light emitting section and a light sensing section. Then, the light emitting section and the light sensing section face each other across a plane (a conveyance plane) along which the sheet S is conveyed. As a result, when the sheet S passes through the positions where the sheet detection sensors 103a, 103b, and 103c are arranged, the lights outputted from the light emitting sections are interrupted by the sheet S and are not received by the light sensing sections. Therefore, when the front end of the sheet S passes the sheet detection sensors 103a, 103b, and 103c, since the light sensing sections of the sheet detection sensors 103a, 103b, and 103c do not receive the lights from the light emitting sections, the sheet detection sensors 103a, 103b, and 103c detect the front end of the sheet S (here, the sheet detection sensors 103a, 103b, and 103c output high (H) level). Then, the sheet S is conveyed to the skew correction operation unit 110. In this embodiment, both the interval between the sheet detection sensors 103a and 103b and the interval between the sheet detection sensors 103b and 103c are about 9 cm. Therefore, a skew amount can be detected even when an A4 size original is conveyed so that a shorter side of the original is perpendicular to the conveyance direction. It should be noted that the sensor interval is not limited to 9 cm.

The skew correction operation unit 110 is provided with stepping motors 104a and 104b that drive skew correction rollers (conveyance units) 101a and 101b, respectively. The skew correction rollers 101a and 101b are arranged on a conveyance path at a predetermined interval in a width direction intersecting (intersecting perpendicularly in this example) the conveyance direction of the sheet S. The above-mentioned sheet detection sensors 103a, 103b, and 103c are arranged at the upstream from the skew correction rollers 101a and 101b in the sheet conveyance direction.

Driven rollers 102a and 102b face the skew correction rollers 101a and 101b, respectively, across the plane (the conveyance plane) along which the sheet S is conveyed, and rotate by following the rotations of the skew correction rollers 101a and 101b. A sheet detection sensor 105 is arranged at the downstream from the skew correction roller 101b. This sheet detection sensor 105 has a similar configuration to the sheet detection sensor 103a, and a light emitting section and a light sensing section thereof face each other across the plane (the conveyance plane) along which the sheet S is conveyed.

The skew correction drive control unit 1a shown in FIG. 1 drives and controls the stepping motors 104a and 104b according to the control signal given from the printer control unit 2 and the detection results of the sheet detection sensors 103a, 103b, and 103c, as described below. This enables the pair of the skew correction roller 101a and the driven roller 102a, and the pair of the skew correction roller 101b and the driven roller 102b to convey the sheet S and to correct the skew is corrected by turning the sheet S on the conveyance plane.

Figure 3A:
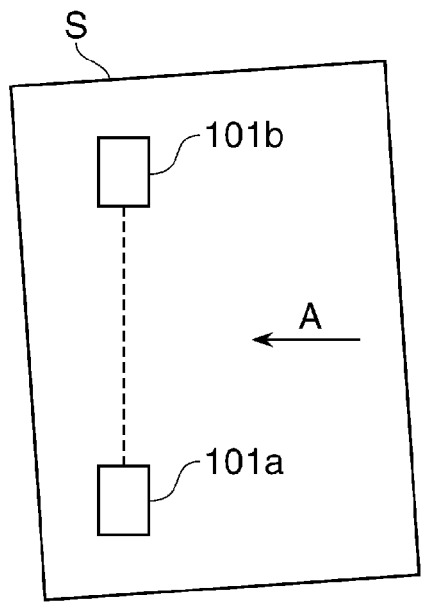
FIG. 3A is a view showing an example of a skew state of a sheet conveyed to the skew correction unit shown in FIG. 2.
Figure 3B:
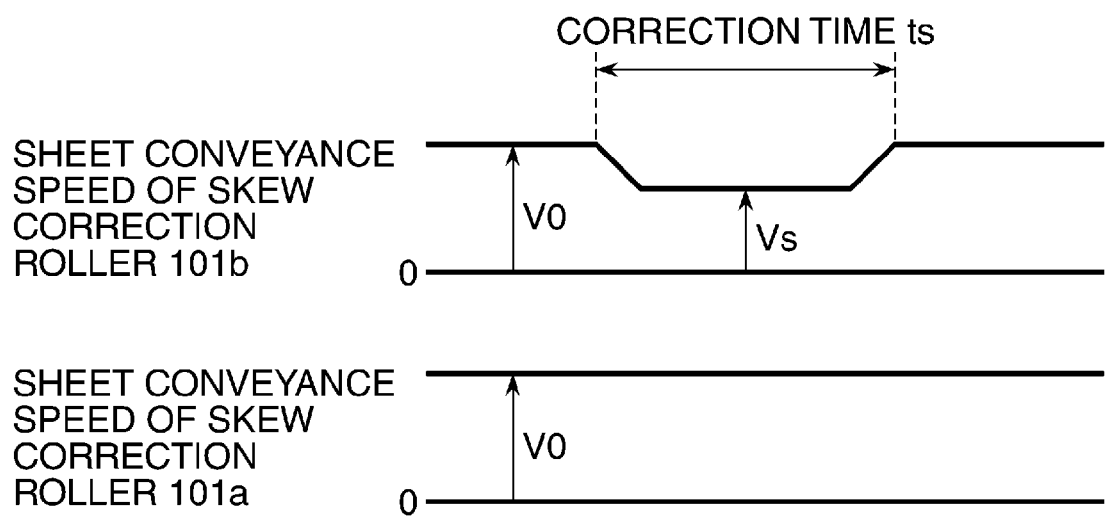
FIG. 3B is a view showing an example of conveyance speeds of skew correction rollers of the skew correction unit shown in FIG. 2.

FIG. 3A is a view showing an example of a skew state of the sheet S conveyed to the skew correction unit 1 shown in FIG. 2. FIG. 3B is a view showing an example of conveyance speeds of the skew correction rollers 101a and 101b.

As shown in FIG. 3A, it is assumed that the sheet S that is conveyed in the conveyance direction A skews so that the side of the skew correction roller 101b precedes. In this case, after the third sheet detection sensor 103c shown in FIG. 2 detects the tip portion (front end) of the sheet S, the second sheet detection sensor 103b will detect the tip portion of the sheet S. Subsequently, the first sheet detection sensor 103a detects the tip portion of the sheet S. Then, the skew amount of the sheet S is computed according to the differences among the timings of detecting the sheet S in the sheet detection sensors 103a, 103b, and 103c, as described below.

When the sheet S skews as mentioned above, the skew correction drive control unit 1a drives the skew correction roller 101a at a constant conveyance speed V0, and drives the skew correction roller 101b at a slower conveyance speed Vs (Vs<V0) during a correction time is corresponding to the skew amount, as shown in FIG. 3B. Accordingly, the difference of the conveyance speeds of the skew correction rollers 101a and 101b turns the sheet S and corrects the skew.

Figure 4B:
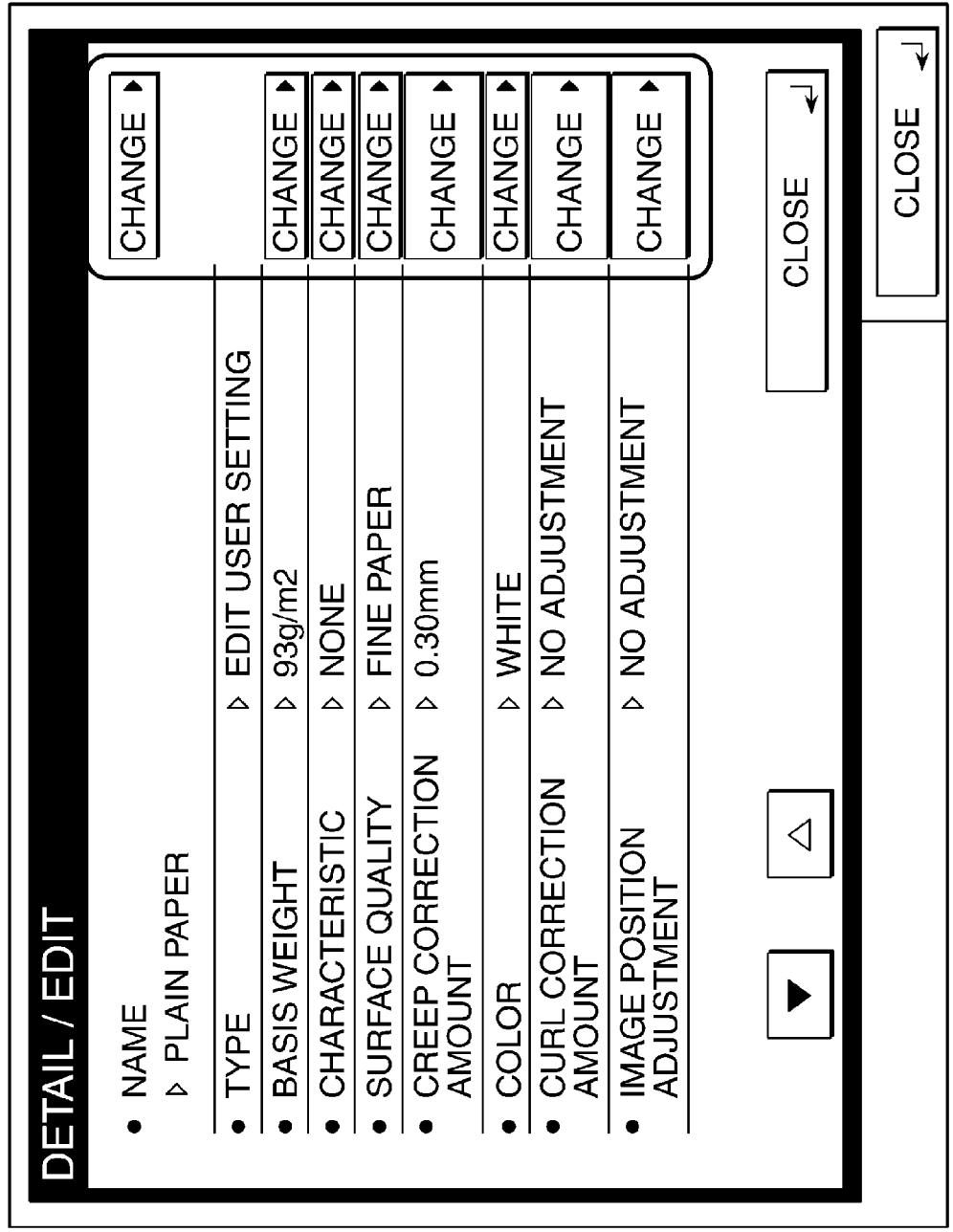
FIG. 4B is a view showing a sheet characteristic screen displayed when a "DETAIL/EDIT" button in the sheet list screen shown in FIG. 4A is pushed.

FIG. 4A is a view showing an example of a sheet list screen displayed on the operation-display unit 4 shown in FIG. 1. FIG. 4B is a view showing a sheet characteristic screen displayed when a "DETAIL/EDIT" button in the sheet list screen shown in FIG. 4A is pushed. FIG. 4C is a view showing a selection screen displayed when a "CHANGE" button for a "CHARACTERISTIC" item in the sheet characteristic screen shown in FIG. 4B is pushed.

Information about a sheet is registered into the sheet information storage unit 8 shown in FIG. 1 as a sheet list. This sheet list is the information about all the sheets that may be used in the image forming apparatus, and constitutes a database.

When a user operates a database button (not shown) displayed on the operation-display unit 4, the controller 3 reads the sheet list from the sheet information storage unit 8 and displays the sheet list screen (FIG. 4A) on the operation-display unit 4. It should be noted that details of the sheet list are not shown in FIG. 4A.

A condition and basis weight are displayed on the sheet list screen shown in FIG. 4A for every registered sheet. A "DETAIL/EDIT" button, a "COPY" button, a "SHEET DATABASE" button, etc. are displayed on this screen. The sheet information generally used in the image forming apparatus is beforehand registered into the sheet list. It should be noted that a user can register a sheet type that has not been registered in the sheet list concerned.

Here, the sheet information expresses a sheet name, basis weight, surface quality, a color, a correction value for a deviation, a correction value for a curl, and a characteristic of sheet shape (referred to as a sheet characteristic). When a user selects a desired sheet from the sheet list and operates the "DETAIL/EDIT" button in the screen shown in FIG. 4A, the controller 3 displays the sheet characteristic screen shown in FIG. 4B on the operation-display unit 4. In the example shown in FIG. 4B, the sheet characteristic screen about a plain sheet is displayed. When the user pushes the "CHANGE" button for the "CHARACTERISTIC" (shape) item in the sheet characteristic screen, the selection screen shown in FIG. 4C is displayed. In the selection screen, the user can select a regular rectangular sheet (a plain sheet, for example), an index sheet, or a loose-leaf sheet, etc.

Figure 5A:
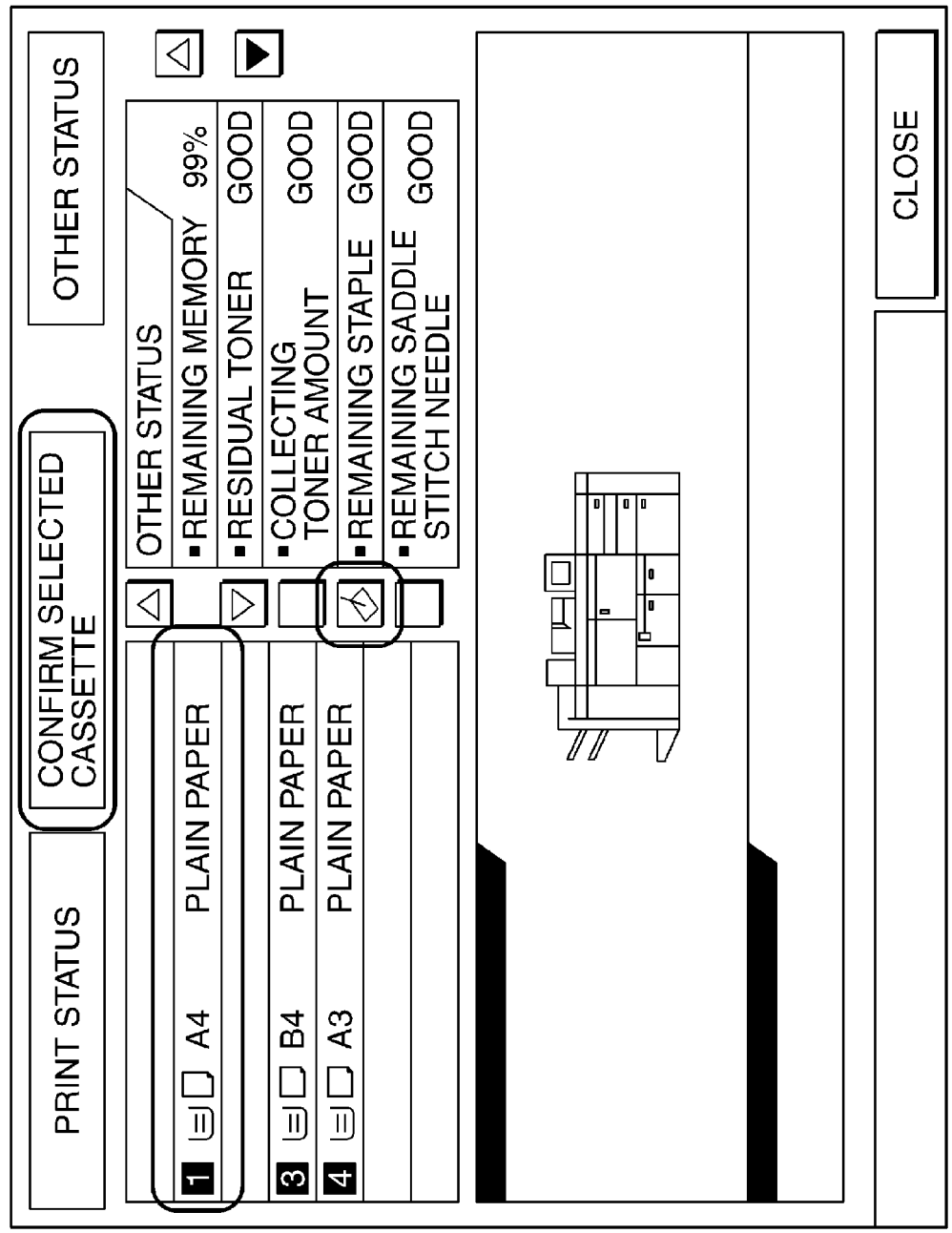
FIG. 5A is a view showing a sheet selection-registration screen displayed on the operation-display unit shown in FIG. 1.
Figure 5B:
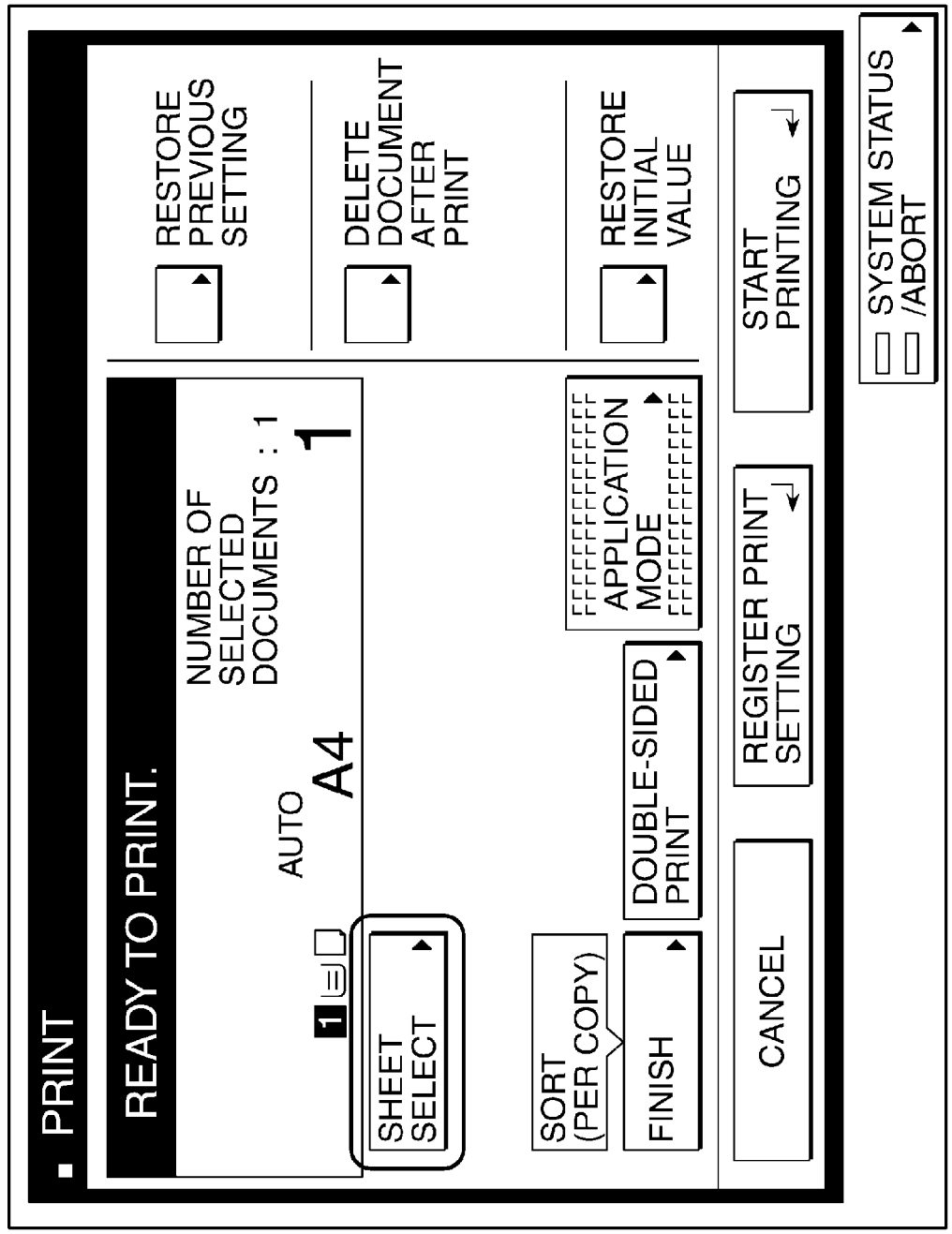
FIG. 5B is a view showing a print basic screen displayed on the operation-display unit shown in FIG. 1.
Figure 5C:
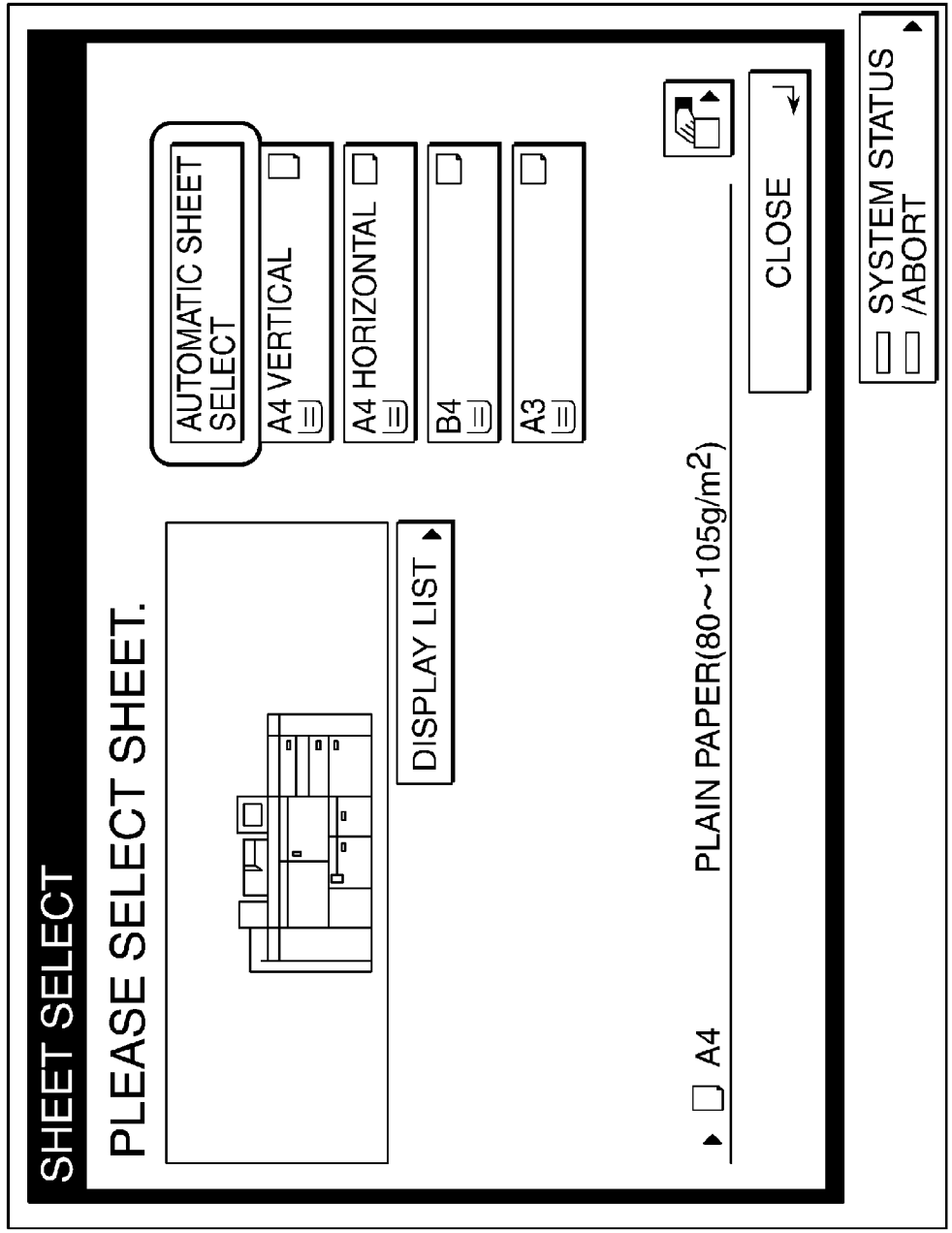
FIG. 5C is a view showing a sheet selection screen displayed when a sheet selection button shown in FIG. 5B is pushed.
Figure 5E:
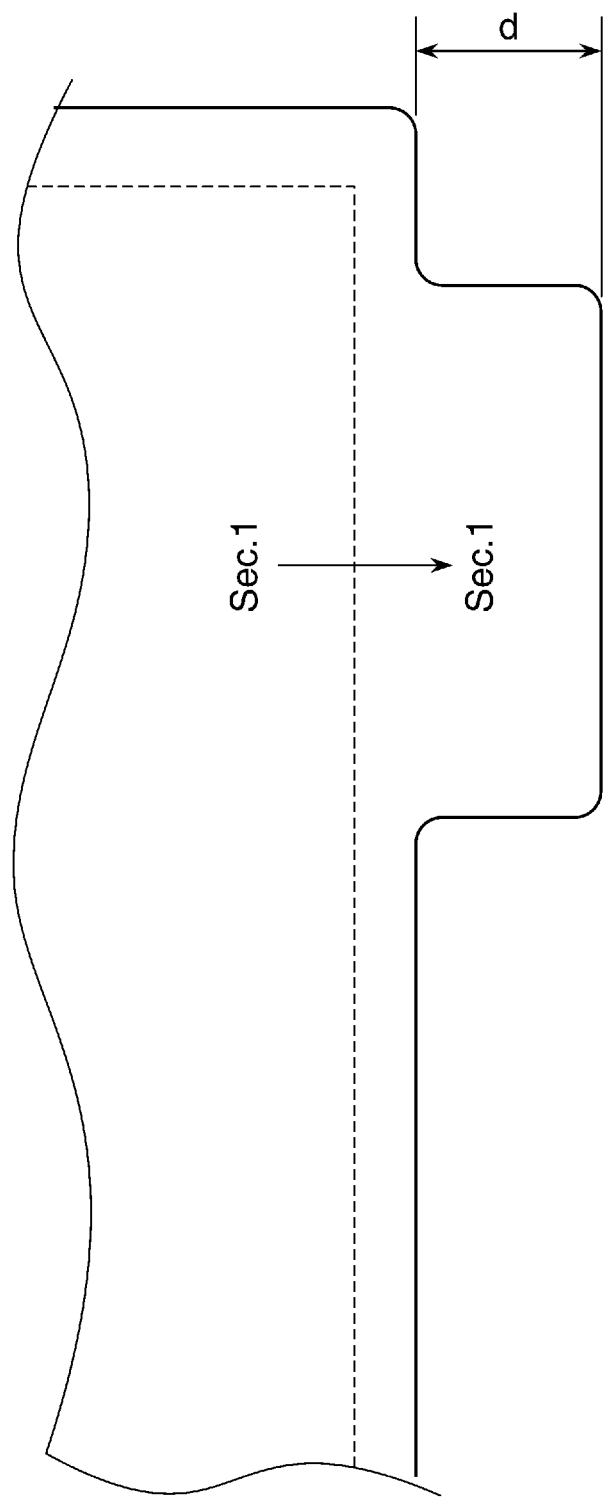
FIG. 5E is a view showing a projection dimension (print shift amount) of an index part.

FIG. 5A is a view showing a sheet selection-registration screen displayed on the operation-display unit 4 shown in FIG. 1. FIG. 5B is a view showing a print basic screen displayed on the operation-display unit shown in FIG. 1. FIG. 5C is a sheet selection screen for selecting a sheet cassette that contains sheets displayed when a sheet selection button shown in FIG. 5B is pushed. FIG. 5D is a view showing a print shift width selection screen for selecting a print shift width of an index sheet print. FIG. 5E is a view showing a projection dimension (print shift amount) of an index part.

Subsequently, when the user selects a sheet type and a sheet size among the sheets contained in the sheet cassettes in the screen shown in FIG. 5A displayed on the operation-display unit 4, the controller 3 registers the sheet type and the sheet size into the sheet information storage unit 8. Here, when the sheet type is an index sheet, the number of partitions of indexes is designated.

Next, the user selects a document (a file) to be printed. When printing with an index sheet, the user selects a document including an image that is printed in an index part. Then, the user selects the sheet cassette that contains the sheets to be used for print in the screen shown in FIG. 5C displayed on the operation-display unit 4. As for the case of an index sheet, the user designates the number of partitions of indexes and sets the projection dimension d of an index part (print shift width, see FIG. 5E) on the screen shown in FIG. 5D.

In addition, the user designates an index page in the document to be printed (a page to which an index sheet is inserted). When there are a plurality of index pages, a plurality of index pages are set. The image data of the page designated as an index is printed while shifting an image printing position according to the index shift amount set previously. Accordingly, the image is printed in an index part.

Figure 6:
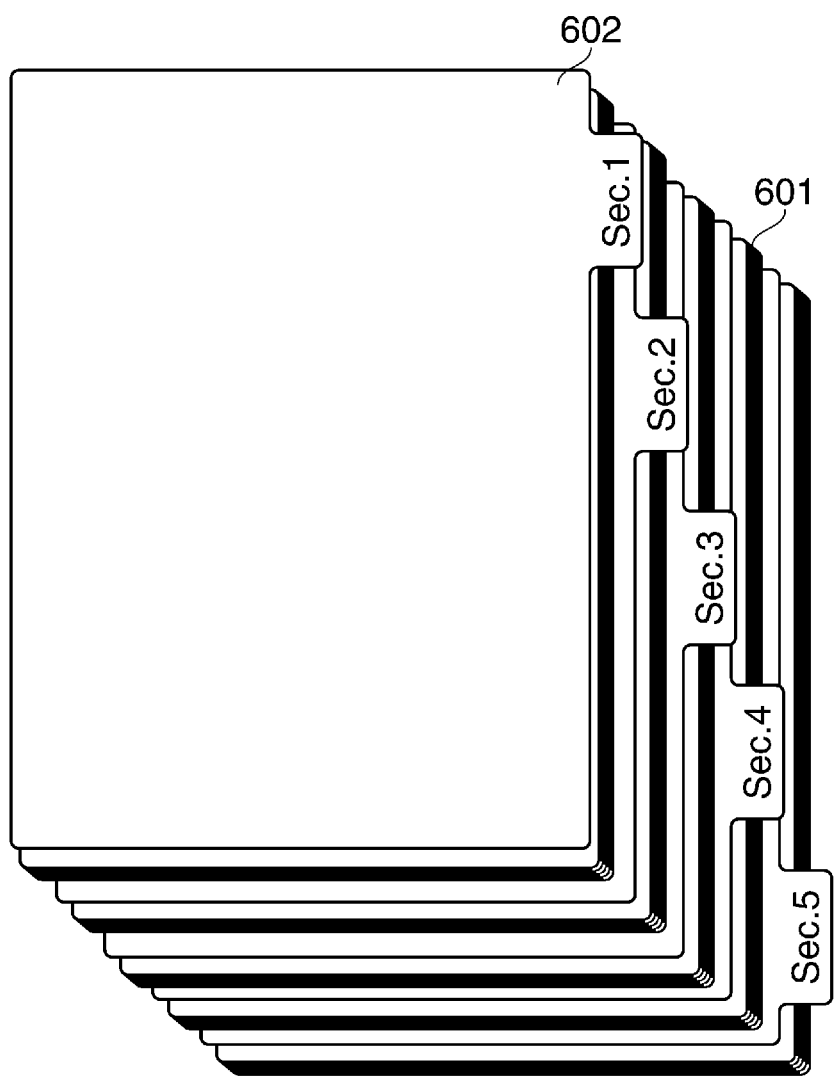
FIG. 6 is a view showing an example of a printed matter that has index pages.

FIG. 6 is a view showing an example of a printed matter that has index pages. When a print is started, as shown in FIG. 6, a regular page without an index part is printed to a set-up sheet 601, and an index page is printed by enlarging an image forming region so that the image of an index part is printed.

Thus, the sheet information about the set-up sheet is stored into the sheet information storage unit 8 shown in FIG. 1. Then, when printing, the sheet information (i.e., the sheet list) is used in order to set an image forming condition suitable for the sheet to be used etc. The information about the index part of the index sheet (the information presenting the shape, the projection dimension) is used as a parameter of the skew correction operation mentioned later.

Figure 7A:
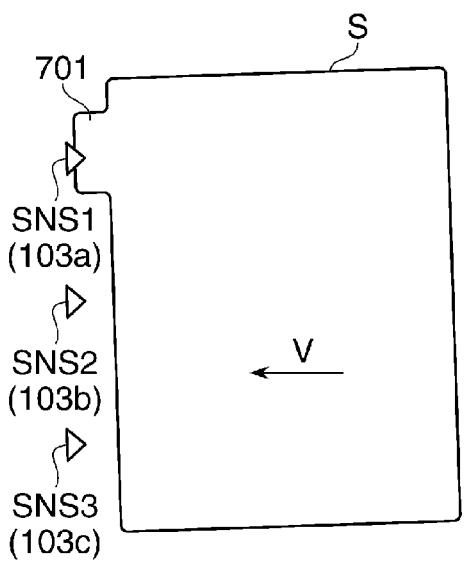
FIG. 7A is a view showing a positional relationship between sheet detection sensors and a front end of an index sheet when the index sheet of which an index part is located at a side section of a front end is skewed and conveyed to the skew correction unit shown in FIG. 1.
Figure 7B:
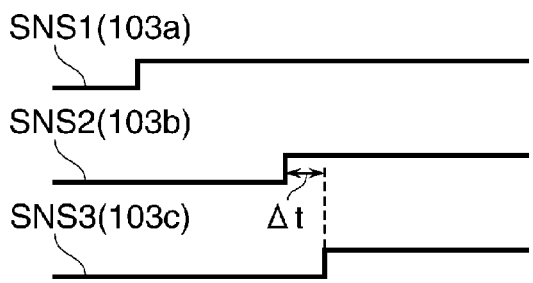
FIG. 7B is a view showing signals outputted from the sheet detection sensors when the index sheet shown in FIG. 7A is conveyed.
Figure 7C:
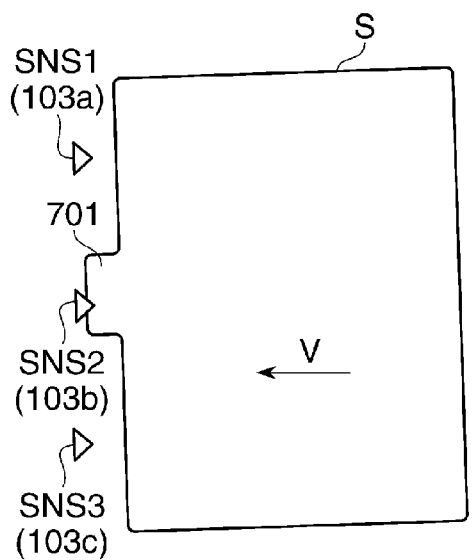
FIG. 7C is a view showing a positional relationship between the sheet detection sensors and a front end of an index sheet when the index sheet of which an index is located at the center section of a front end is skewed and conveyed to the skew correction unit shown in FIG. 1.
Figure 7D:
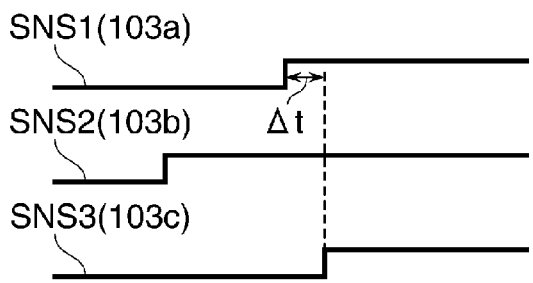
FIG. 7D is a view showing signals outputted from the sheet detection sensors when the index sheet shown in FIG. 7C is conveyed.

FIG. 7A is a view showing a positional relationship between the sheet detection sensors and a front end of an index sheet when the index sheet of which an index part is located at a side section in the sheet width direction of a front end is skewed and conveyed to the skew correction unit 1 shown in FIG. 1. FIG. 7B is a view showing signals outputted from the sheet detection sensors when the index sheet shown in FIG. 7A is conveyed. FIG. 7C is a view showing a positional relationship between sheet detection sensors and a front end of an index sheet when the index sheet of which an index part is located at the center section in the sheet width direction of a front end is skewed and conveyed to the skew correction unit 1 in FIG. 1. FIG. 7D is a view showing signals outputted from the sheet detection sensors when the index sheet shown in FIG. 7C is conveyed.

When the sheet conveyance device conveys the index sheet S of which an index part 701 is located at a side section in the sheet width direction as shown in FIG. 7A, the index part 701 is detected by the sheet detection sensor 103a (SNS1). It should be noted that the index part 701 is a convex part projected to the conveyance direction as illustrated.

When the front end of the index part 701 of the index sheet S passes the sheet detection sensor 103a (SNS1), the sheet detection sensor 103a detects the front end and gives a first sheet detection signal (here high (H) level) to the skew correction drive control unit 1a.

Since the index sheet S skews so that the upper part in the figure precedes slightly as shown in FIG. 7A, the sheet detection sensor 103b (SNS2) detects the front end other than the index part of the index sheet S, and gives a second sheet detection signal (H level) to the skew correction drive control unit 1a after the sheet detection sensor 103a (SNS1) detects the front end of the index part 701.

Subsequently, the sheet detection sensor 103c (SNS3) detects the front end of the index sheet S, and gives a third sheet detection signal (H level) to the skew correction drive control unit 1a after the sheet detection sensor 103b (SNS2) detects the front end of the index sheet S.

When a standard size sheet without an index part is skewed and conveyed, the difference between the detection timings of the sheet detection sensors 103a and 103b is equal to the difference between the detection timings of the sheet detection sensors 103b and 103c.

On the other hand, when the index sheet S in FIG. 7A is skewed and conveyed, the time from the detection of the front end of the index part 701 by the sheet detection sensor 103a to the detection of the front end of the index sheet S by the sheet detection sensor 103b is longer than the time from the detection of the front end of the index sheet S by the sheet detection sensor 103b to the detection of the front end of the index sheet S by the sheet detection sensor 103c (see FIG. 7B).

In other words, when a general rectangular standard size sheet (an A4 size sheet, for example) is conveyed, the differences among the detection timings by the sheet detection sensors 103a, 103b, and 103c do not match the pattern shown in FIG. 7B. The projection dimension d of the index part 701 of a general index sheet is ½ inch (about 12 mm). Therefore, when the time from the detection of the front end of the index part 701 by the sheet detection sensor 103a to the detection of the front end of the index sheet S by the sheet detection sensor 103b exceeds a predetermined threshold value, the skew correction drive control unit 1a can determine that the sheet detection sensor 103a detected the index part 701. The above-mentioned predetermined threshold value is determined in consideration of the conceivable upper limit of the skew amount of a standard size sheet and the projection dimension of the index part 701. Specifically, assuming that the skew upper limit is ±3 mm and the projection dimension is about 12 mm, when both the sheet detection sensors 103a and 103b detect the section other than the index part, the skew amount falls within a range of −3 mm through 3 mm. Since the distance between the sheet detection sensors 103a and 103b is 90 mm, the conceivable upper limit of a skew angle θ is obtained by tan θ=3/90. The skew angle θ is about 2 degrees. When only one sensor detects the index part, the skew amount falls within a range of 9 mm through 15 mm by adding the projection dimension 12 mm of the index part. In this example, the threshold value for determination is 6 mm that is a mean value of 3 mm and 9 mm.

In this case, the skew correction drive control unit 1a determines the skew amount according to the product of the time (the detection time) Δt from the output of the second sheet detection signal by the sheet detection sensor 103b to the output of the third sheet detection signal by the sheet detection sensor 103c and the sheet conveyance speed V, and corrects the skew of the index sheet S by controlling the conveyance speeds of the skew correction rollers 101a and 101b.

That is, the skew correction drive control unit 1a does not use the sheet detection signal received first, but sets the time deference between the sheet detection signals received secondly and thirdly to the detection time Δt, and corrects the skew of the index sheet S by controlling the conveyance speeds of the skew correction rollers 101a and 101b according to the detection time Δt.

Subsequently, when the sheet conveyance device conveys an index sheet S of which an index part 701 is located at the center section as shown in FIG. 7C, the index part 701 is detected by the sheet detection sensor 103b (SNS2). When the front end of the index part 701 of the index sheet S passes the sheet detection sensor 103b (SNS2), the sheet detection sensor 103b detects the front end, and gives the second sheet detection signal (H level) to the skew correction drive control unit 1a.

Since the index sheet S skews so that the upper part precedes slightly as shown in FIG. 7C, the sheet detection sensor 103a (SNS1) detects the front end of the index sheet S, and gives a first sheet detection signal (H level) to the skew correction drive control unit 1a after the sheet detection sensor 103b (SNS2) detects the front end of the index part 701. Subsequently, the sheet detection sensor 103c (SNS3) detects the front end of the index sheet S, and gives a third sheet detection signal (H level) to the skew correction drive control unit 1a after the sheet detection sensor 103a (SNS1) detects the front end of the index sheet S. In this case, the skew correction drive control unit 1a corrects the skew of the sheet S by controlling the conveyance speeds of the skew correction rollers 101a and 101b according to the time (the detection time) Δt from the output of the first sheet detection signal by the sheet detection sensor 103a to the output of the third sheet detection signal by the sheet detection sensor 103c.

That is, in the case of FIG. 7C, the skew correction drive control unit 1a does not use the sheet detection signal received first, but sets the time deference between the sheet detection signals received secondly and thirdly to the detection time Δt, and corrects the skew of the index sheet S by controlling the conveyance speeds of the skew correction rollers 101a and 101b according to the detection time Δt as with the case of FIG. 7A.

When the width of the index part of the sheet S is too small to be detected by any of sheet detection sensors 103a, 103b, and 103c, or when the sheet is rectangular, the sheet detection sensors 103a, 103b, and 103c detect the front end of the sheet (the main part of the sheet). In this case, the skew correction drive control unit 1a controls the conveyance speeds of the skew correction rollers 101a and 101b according to the time difference of the two sheet detection signals received secondly and thirdly without using the sheet detection signal received first as with the case where the index part 701 is detected.

Incidentally, there is a limit on accuracy of the correction by the skew correction rollers 101a and 101b. That is, when the skew correction amount is larger than a predetermined amount, a correction error becomes large, and the skew cannot be necessarily corrected to a target level. Therefore, the rear end of the sheet (index sheet) S is preparatorily detected by the sheet detection sensors 103a, 103b, and 103b after the skew correction by detecting the front end.

Figure 8A:
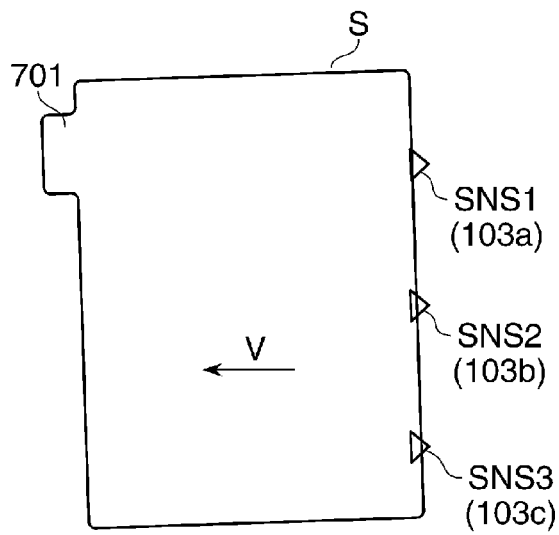
FIG. 8A is a view showing a positional relationship between the sheet detection sensors and a rear end of an index sheet when the index sheet of which an index part is located at a front end in a conveyance direction is skewed and conveyed to the skew correction unit shown in FIG. 1.
Figure 8B:
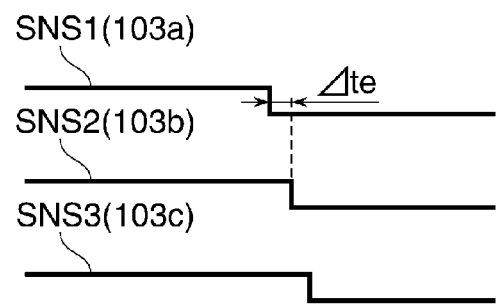
FIG. 8B is a view showing signals outputted from the sheet detection sensors when the index sheet shown in FIG. 8A is conveyed.
Figure 8C:
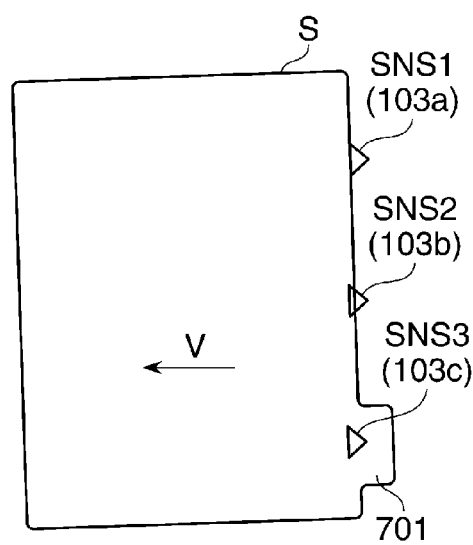
FIG. 8C is a view showing a positional relationship between the sheet detection sensors and a rear end of an index sheet when the index sheet of which an index part is located at a rear end in the conveyance direction is skewed and conveyed to the skew correction unit shown in FIG. 1.
Figure 8D:
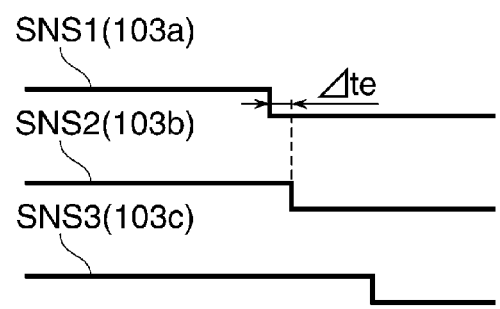
FIG. 8D is a view showing signals outputted from the sheet detection sensors when the index sheet shown in FIG. 8C is conveyed.

FIG. 8A is a view showing a positional relationship between the sheet detection sensors and a rear end of an index sheet when the index sheet of which an index part is located at a front end in a conveyance direction is skewed and conveyed to the skew correction unit 1 shown in FIG. 1. FIG. 8B is a view showing signals outputted from the sheet detection sensors when the index sheet shown in FIG. 8A is conveyed. FIG. 8C is a view showing a positional relationship between the sheet detection sensors and a rear end of an index sheet when the index sheet of which an index part is located at a rear end in the conveyance direction is skewed and conveyed to the skew correction unit 1 in FIG. 1. FIG. 8D is a view showing signals outputted from the sheet detection sensors when the index sheet shown in FIG. 8C is conveyed.

Since the index sheet S skews so that the upper part precedes slightly as shown in FIG. 8A, the sheet detection sensor 103a (SNS1) detects the rear end of the index sheet S, and then, the sheet detection sensor 103b (SNS2) detects the rear end of the index sheet S. Then, the sheet detection sensor 103c (SNS3) detects the rear end of the index sheet S. When the rear end is detected, the outputs of the sheet detection sensors 103a, 103b, and 103c vary from the H level to the low (L) level.

As shown in FIG. 8B, the skew correction drive control unit 1a sets the time deference between the sheet detection signal received first (the first sheet detection signal in this example) and the sheet detection signal received secondly (the second sheet detection signal in this example) to the detection time $\Delta$te, and recorrects the skew of the index sheet S by controlling the conveyance speeds of the skew correction rollers 101a and 101b according to the detection time $\Delta$te. In this case, since the skew correction is performed as mentioned above according to the front end detection, the detection time $\Delta$te (the rear-end detection time) is extremely small. Therefore, when the skew correction drive control unit 1a corrects the skew according to the detection time $\Delta$te, the skew of the index sheet is corrected nearly completely.

The index part 701 is detected by the sheet detection sensor 103c (SNS3) in FIG. 8C. In this example, the sheet detection sensor 103b (SNS2) detects the rear end of the index sheet S after the sheet detection sensor 103a (SNS1) detects the rear end of the index sheet S. Then, the sheet detection sensor 103c (SNS3) detects the rear end of the index part 701. Then, the time from the detection of the rear end of the index sheet S by the sheet detection sensor 103a to the detection of the rear end of the index sheet S by the sheet detection sensor 103b is shorter than the time from the detection of the rear end of the index sheet S by the sheet detection sensor 103b to the detection of the rear end of the index part 701 by the sheet detection sensor 103c.

As shown in FIG. 8D, the skew correction drive control unit 1a sets the time deference between the sheet detection signal received first (the first sheet detection signal in this example) and the sheet detection signal received secondly (the second sheet detection signal in this example) to the rear-end detection time $\Delta$te, and corrects the skew of the index sheet S by controlling the conveyance speeds of the skew correction rollers 101a and 101b according to the rear-end detection time $\Delta$te.

Since the projection dimension d of the index part 701 is larger than the maximum skew amount assumed when the index part 701 is detected by any of the sheet detection sensors 103a and 103b, the rear end of the index part 701 is detected at last. Therefore, the skew correction drive control unit 1a should set the time difference between the sheet detection signal received first and the sheet detection signal received secondly as the rear-end detection time $\Delta$te in this case.

As described for the front end detection of the index sheet, even when none of the sheet detection sensors 103a, 103b, and 103c detect the index part 701, the skew correction drive control unit 1a should set the time difference between the sheet detection signal received first and the sheet detection signal received secondly to the detection time $\Delta$te.

FIG. 9 is a flowchart showing a skew detection-correction process that is performed by the skew correction unit 1 shown in FIG. 1. When a user operates to start printing via the operation-display unit 4, the controller 3 controls the printer control unit 2 to perform a print operation as mentioned above. In this case, a sheet is conveyed from the sheet cassette as mentioned above, and the controller 3 starts the skew correction control for a sheet. When starting the skew correction control, the controller 3 reads sheet characteristics (a sheet type, a sheet shape, etc.) that is selected by the user from the sheet information storage unit 8, and gives them to the printer control unit 2. Then, the printer control unit 2 gives the sheet characteristics to the skew correction drive control unit 1a (referred to as a control unit 1a, hereafter) together with a skew correction control start signal. Here, the index sheet should be selected as a sheet.

When receiving the skew correction control start signal, the control unit 1a checks whether any two of the sheet detection sensors 103a (SNS1), 103b (SNS2), and 103c (SNS3) detected the sheet front end (S901). When any two of the sheet detection sensors 103a, 103b, and 103c detect a sheet front end (YES in S901), the control unit 1a starts a built-in front-end skew detection timer in order to measure the front-end detection time (S902). Then, the control unit 1a checks whether all the sheet detection sensors 103a, 103b, and 103c detected the sheet front end (S903). When all the sheet detection sensors 103a, 103b, and 103c detect the sheet front end (YES in S903), the control unit 1a suspends the time measurement of the front-end skew detection timer. The control unit 1a sets the measured time of the skew detection timer as a detection time difference (a front-end detection time) $\Delta$t, and computes a skew amount (a front-end skew amount) according to the front-end detection time $\Delta$t (S905). It should be noted that the front-end skew amount is also denoted by the symbol $\Delta$t in the following description.

Subsequently, the control unit 1a computes a correction time ts described in FIG. 3B according to an equation (1) (S906).

$$ts = a \cdot V0 \cdot \Delta t/(V0 - Vs) + b \qquad (1)$$

Where, a symbol "V0" denotes regular sheet conveyance speed in the skew correction unit 1, a symbol "Vt" denotes sheet conveyance speed during the skew correction operation in the skew correction unit 1, a symbol "a" denotes a correction value for adjusting slips of the skew correction rollers 101a and 101b, and a symbol "b" denotes an offset value for adjusting position errors of the sensors and the skew correction rollers 101a and 101b.

Thus, after computing the correction time ts, the control unit 1a corrects the skew of the sheet by changing the conveyance speed of the skew correction roller 101a or 101b from the speed V0 to the speed Vs during the correction time ts (S907).

Subsequently, the control unit 1a checks whether one of the sheet detection sensors 103a (SNS1), 103b (SNS2), and 103c (SNS3) turned off for the skew correction by the rear end detection (S908). When any one of the sheet detection sensors 103a, 103b, and 103c turns off (YES in S908), the control unit 1a starts a built-in rear-end skew detection timer (not shown) (S909). The control unit 1a checks whether two of the sheet detection sensors 103a, 103b, and 103c turn off (S910). When two of the sheet detection sensors 103a, 102b, and 103c turn off (YES in S910), the control unit 1a suspends the time measurement by the rear-end skew detection timer (S911).

The control unit 1a sets the measured time of the rear-end skew detection timer as a detection time difference (a rear-end detection time) $\Delta te$, and computes a rear-end skew amount according to the rear-end detection time $\Delta te$ (S912). It should be noted that the rear-end skew amount is also denoted by the symbol $\Delta te$ in the following description.

Next, the control unit 1a determines whether the rear-end skew amount $\Delta te$ is smaller than a skew threshold value te specified beforehand (S913). Then, when the rear-end skew amount $\Delta te$ is smaller than the skew threshold value te (YES in S913), the control unit 1a finishes the skew correction control, and notifies the printer control unit 2 about that. On the other hand, when it is determined that the rear-end skew amount $\Delta te$ is equal to or larger than the skew threshold value to (NO in S913), the control unit 1a determines whether the rear-end skew amount $\Delta te$ exceeds a correction upper limit tf (S914). When the rear-end skew amount $\Delta te$ does not exceed the correction upper limit tf, the control unit 1a computes the correction time ts according to the rear-end skew amount $\Delta te$ as mentioned above (S915). Then, the control unit 1a corrects the skew of the sheet by changing the conveyance speed of the skew correction roller 101a or 101b from the speed V0 to the speed Vs during the correction time ts (S916). Then, the control unit 1a finishes the skew correction control.

When the rear-end skew amount $\Delta te$ exceeds the correction upper limit, the control unit 1a notifies the printer control unit 2 of a skew correction error (S917). When receiving the skew correction error, the printer control unit 2 notifies the controller 3 that the rear-end skew amount exceeds the upper limit, and the controller 3 displays the skew correction error on the operation-display unit 4.

In this case, when a printing start operation is performed by the client PC 14-1 or 14-2, the controller 3 notifies the client PC14-1 or 14-2 of the error concerned. Thus, the error display makes a user know that the printed matter includes a sheet of which the skew was not corrected. Alternatively, when the rear-end skew amount $\Delta te$ exceeds the upper limit, the control unit 1a may suspend the print operation according to an excess over the upper limit or may allow a user to select suspension of the print operation.

If the control unit 1a allows a user to select suspension of the print operation in the case of insufficient skew correction operation, a process corresponding to the quality of printed matter that is required by the user can be selected.

Further, when sheet detection sensors 113a, 113b, and 113c (fourth, fifth, and sixth sensors) are arranged independently so as to detect a rear end of a sheet, the sheet detection sensors 103a, 103b, and 103c detect only a front end of the sheet.

Still further, when a plurality of skew correction mechanisms (skew correction rollers etc.) are arranged to correct skew, flexibility in the parts arrangement of the skew correction unit and the circumference can be increased, which can respond to a higher conveyance speed and can increase accuracy of the skew correction operation.

As described above, according to the first embodiment, skew of a conveyed sheet like an index sheet can be corrected with a simple configuration, without setting detailed information about a position and a width of an index part for every sheet.

Subsequently, a sheet conveyance device according to a second embodiment of the present invention will be described. Here describes an image forming apparatus that uses the sheet conveyance device of the second embodiment. The configuration of the image forming apparatus and the mechanical configuration of the sheet conveyance device are the same as that of the example shown in FIG. 1 and FIG. 2. In the second embodiment, although a skew correction operation is performed as shown in FIG. 3A and FIG. 3B, an operation of the skew correction drive control unit 1a shown in FIG. 1 is different from the first embodiment.

Figure 10A:
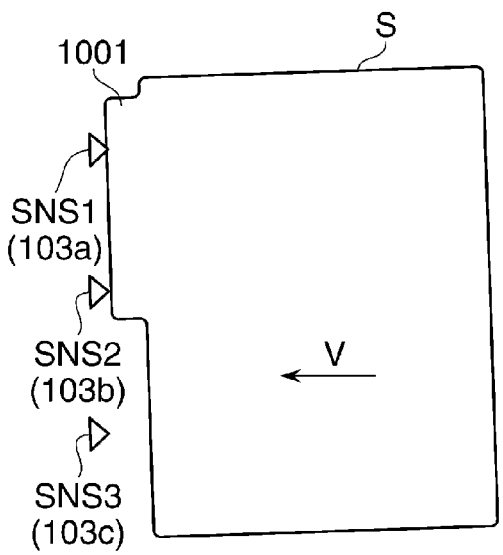
FIG. 10A is a view showing a positional relationship between the sheet detection sensors and a front end of an index sheet when the index sheet of which a wide index part is located at an upper section of the front end in a conveyance direction is skewed and conveyed to the skew correction unit according to a second embodiment of the present invention.
Figure 10B:
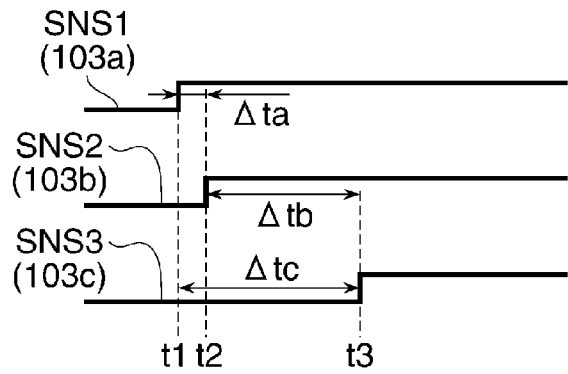
FIG. 10B is a view showing signals outputted from the sheet detection sensors when the index sheet shown in FIG. 10A is conveyed.
Figure 10C:
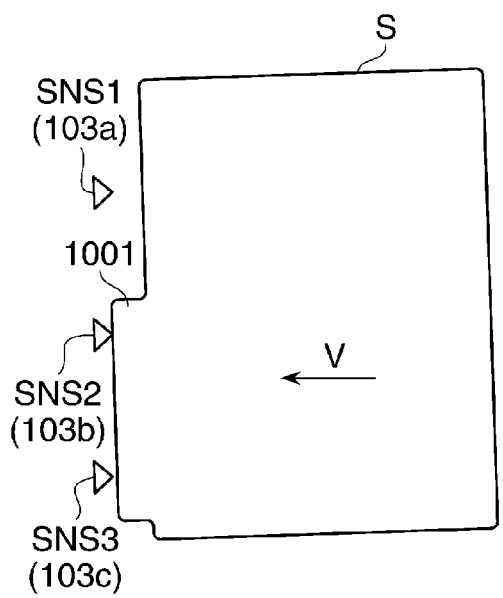
FIG. 10C is a view showing a positional relationship between the sheet detection sensors and a front end of an index sheet when the index sheet of which a wide index part is located at a lower section of the front end in the conveyance direction is skewed and conveyed to the skew correction unit according to the second embodiment of the present invention.
Figure 10D:
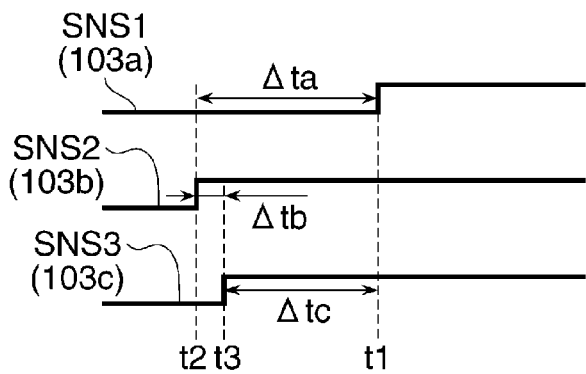
FIG. 10D is a view showing signals outputted from the sheet detection sensors when the index sheet shown in FIG. 10C is conveyed.

FIG. 10A is a view showing a positional relationship between the sheet detection sensors and a front end of an index sheet when the index sheet S of which a wide index part 1001 is located at an upper section of the front end in a conveyance direction is skewed and conveyed to the skew correction unit according to the second embodiment of the present invention. FIG. 10B is a view showing signals outputted from the sheet detection sensors when the index sheet S shown in FIG. 10A is conveyed. FIG. 10C is a view showing a positional relationship between the sheet detection sensors and a front end of an index sheet when the index sheet S of which a wide index part 1001 is located at a lower section of the front end in the conveyance direction is skewed and conveyed to the skew correction unit according to the second embodiment of the present invention. FIG. 10D is a view showing signals outputted from the sheet detection sensors when the index sheet S shown in FIG. 10C is conveyed.

Here, the number of partitions of indexes in the index sheet S is fewer than that in the first embodiment, and the width of the one index part 1001 is wider.

When the sheet conveyance device conveys the index sheet S shown in FIG. 10A, the index part 1001 is detected by the sheet detection sensors 103a (SNS1) and 103b (SNS2). It should be noted that the index part 1001 is a convex part projected to the conveyance direction as illustrated.

Since the index sheet S skews so that the upper part precedes slightly as shown in FIG. 10A, the front end of the index part 1001 of the index sheet S is detected by the sheet detection sensor 103a first. When detecting the front end of the index part 1001, the sheet detection sensor 103a gives a first sheet detection signal (H level) to the skew correction drive control unit 1a. Subsequently, the sheet detection sensor 103b detects the front end of the index part 1001 and gives a second sheet detection signal (H level) to the skew correction drive control unit 1a after the sheet detection sensor 103a detects the front end of the index part 1001. Then, the sheet detection sensor 103c (SNS3) detects the front end of the index sheet S, and gives a third sheet detection signal (H level) to the skew correction drive control unit 1a.

The time $\Delta ta$ from the detection of the front end of the index part 1001 by the sheet detection sensor 103a to the detection of the front end of the index part 1001 by the sheet detection sensor 103b is shorter than the time Δtb from the detection of the front end of the index part 1001 by the sheet detection sensor 103b to the detection of the front end of the index sheet S by the sheet detection sensor 103c.

As shown in FIG. 10B, the output of the sheet detection sensor 103a (SNS1) becomes H level at timing t1 and the output of the sheet detection sensor 103b (SNS2) becomes H level at timing t2. The output of the sheet detection sensor 103c (SNS3) becomes H level at timing t3. Then, the times Δta, Δtb, and Δtc are defined as Δta=t1−t2, Δtb=t2−t3, and Δtc=t3−t1, respectively.

The control unit 1a computes the times Δta, Δtb, and Δtc (i.e., computes three sets of front-end detection times) according to the first, second, and third sheet detection signals, and compares their absolute values |Δta|, |Δtb|, and |Δtc|. Then, the control unit 1a computes a skew amount based on the time of which the absolute value is the smallest (the selected front-end detection time).

In the example shown in FIG. 10B, since an inequality |Δta|<|Δtb|<|Δtc| is satisfied, the control unit 1a controls the conveyance speeds of the skew correction rollers 101a and 101b according to the selected front-end detection time Δta so as to correct the skew of the index sheet S.

Next, when the sheet conveyance device conveys the index sheet S shown in FIG. 10C, the index part 1001 is detected by the sheet detection sensors 103b (SNS2) and 103c (SNS3). Although the index sheet S skews so that the upper part in the drawing precedes slightly, the projection dimension d of the index part 1001 is large as compared with a skew amount as mentioned above. Therefore, the front end of the index part 1001 of the index sheet S is detected by the sheet detection sensor 103b first. When detecting the front end of the index part 1001, the sheet detection sensor 103b gives a second sheet detection signal (H level) to the control unit 1a.

Then, the sheet detection sensor 103c detects the front end of the index part 1001, and gives a third sheet detection signal (H level) to the control unit 1a. Finally, the sheet detection sensor 103a detects the front end of the index sheet S, and gives a first sheet detection signal (H level) to the control unit 1a.

As shown in FIG. 10D, the times Δta, Δtb, and Δtc are defined as Δta=t1−t2, Δtb=t2−t3, and Δtc=t3−t1, respectively. The control unit 1a computes the times Δta, Δtb, and Δtc (i.e., computes three sets of front-end detection times) according to the first, second, and third sheet detection signals, and compares their absolute values |Δta|, |Δtb|, and |Δtc|. In the example shown in FIG. 10D, since an inequality |Δtb|<|Δtc|<|Δta| is satisfied, the control unit 1a controls the conveyance speeds of the skew correction rollers 101a and 101b according to the detection time (the selected front-end detection time) Δtb so as to correct the skew of the index sheet S.

As described in the first embodiment, there is a limit on accuracy of the correction by the skew correction rollers 101a and 101b. Therefore, it is preferable that the rear end of the sheet (index sheet) is preparatorily detected by the sheet detection sensors 103a, 103b, and 103b after the skew correction by detecting the front end.

Figure 11A:
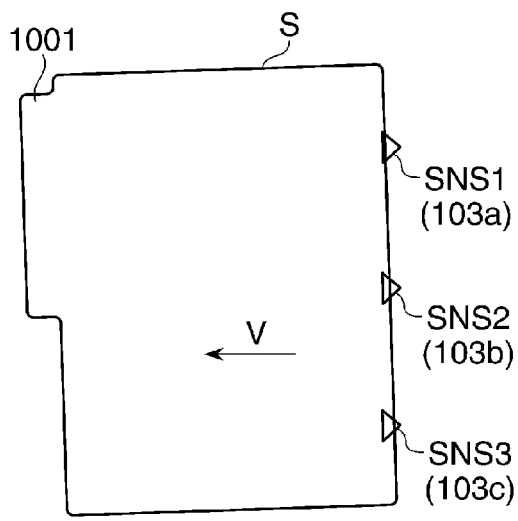
FIG. 11A is a view showing a positional relationship between the sheet detection sensors and a rear end of an index sheet when the index sheet of which a wide index part is located at an upper section of the front end in the conveyance direction is skewed and conveyed to the skew correction unit according to the second embodiment of the present invention.
Figure 11B:
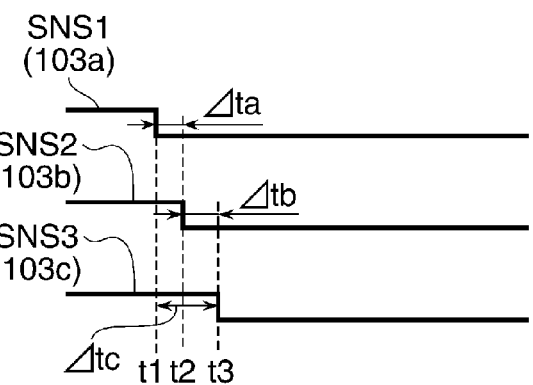
FIG. 11B is a view showing signals outputted from the sheet detection sensors when the index sheet shown in FIG. 11A is conveyed.
Figure 11C:
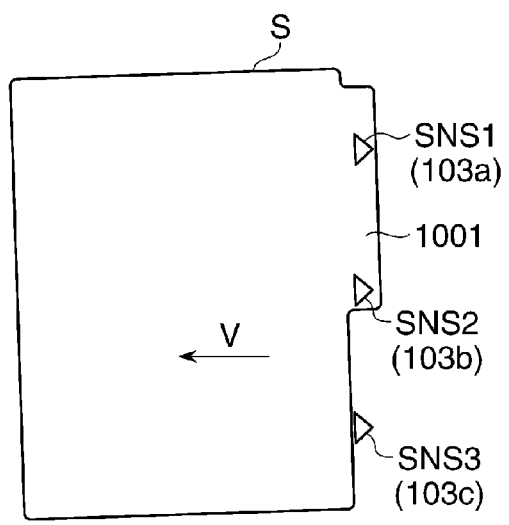
FIG. 11C is a view showing a positional relationship between the sheet detection sensors and a rear end of an index sheet when the index sheet of which a wide index part is located at an upper section of the rear end in the conveyance direction is skewed and conveyed to the skew correction unit according to the second embodiment of the present invention.
Figure 11D:
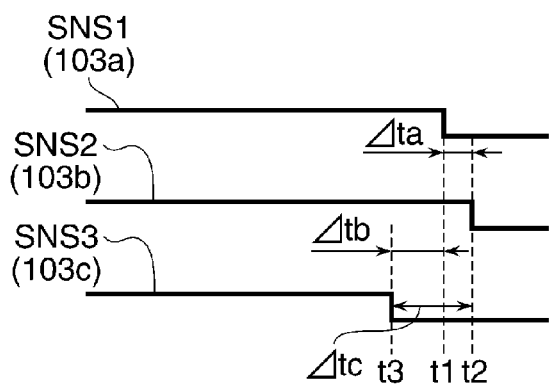
FIG. 11D is a view showing signals outputted from the sheet detection sensors when the index sheet shown in FIG. 11C is conveyed.
Figure 13:
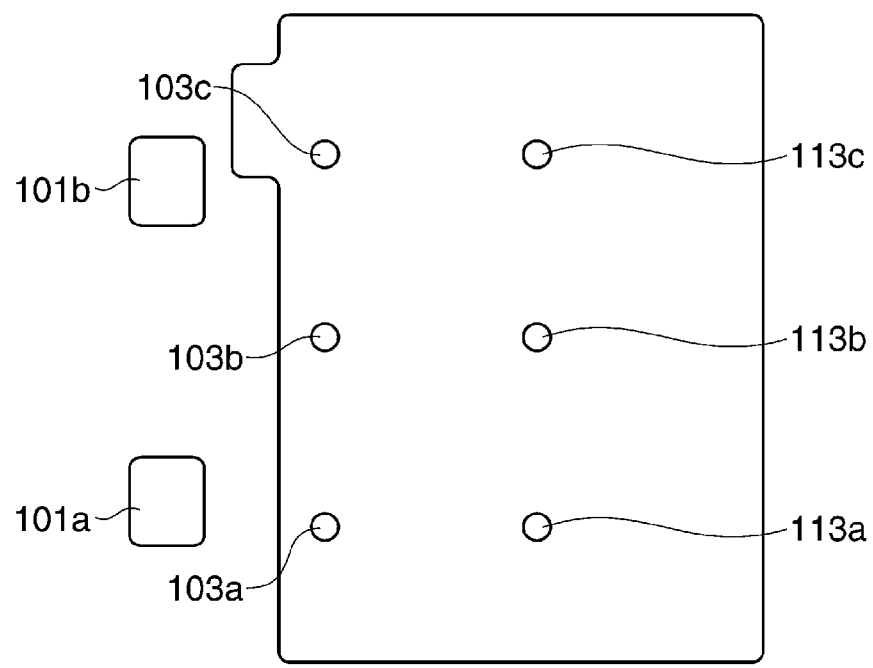
FIG. 13 is a view showing a positional relationship between the sensors and the sheet in a modification of the second embodiment.

FIG. 11A is a view showing a positional relationship between the sheet detection sensors and a rear end of an index sheet when the index sheet of which a wide index part is located at an upper section of the front end in the conveyance direction is skewed and conveyed to the skew correction unit according to the second embodiment of the present invention. FIG. 11B is a view showing signals outputted from the sheet detection sensors when the index sheet shown in FIG. 11A is conveyed. FIG. 11C is a view showing a positional relationship between the sheet detection sensors and a rear end of an index sheet when the index sheet of which a wide index part is located at an upper section of the rear end in the conveyance direction is skewed and conveyed to the skew correction unit according to the second embodiment of the present invention. FIG. 11D is a view showing signals outputted from the sheet detection sensors when the index sheet shown in FIG. 11C is conveyed.

Since the index sheet S skews so that the upper part precedes slightly in the drawing when the sheet conveyance device conveys the index sheet S shown in FIG. 11A, the sheet detection sensor 103a (SNS1) detects the rear end of the index sheet S, and then, the sheet detection sensor 103b (SNS2) detects the rear end of the index sheet S. Then, the sheet detection sensor 103c (SNS3) detects the rear end of the index sheet S. When the rear end is detected, the outputs of the sheet detection sensors 103a, 103b, and 103c vary from the H level to the low (L) level.

As shown in FIG. 11B, the output of the sheet detection sensor 103a (SNS1) becomes L level at timing t1 and the output of the sheet detection sensor 103b (SNS2) becomes L level at timing t2. The output of the sheet detection sensor 103c (SNS3) becomes L level at timing t3. Then, the times Δta, Δtb, and Δtc are defined as Δta=t1−t2, Δtb=t2−t3, and Δtc=t3−t1, respectively.

The control unit 1a computes the times Δta, Δtb, and Δtc (i.e., computes three sets of rear-end detection times) according to the first, second, and third sheet detection signals, and compares their absolute values |Δta|, |Δtb|, and |Δtc|. Then, the control unit 1a computes a skew amount based on the detection time of which the absolute value is the smallest (the selected rear-end detection time).

In the example shown in FIG. 11A and FIG. 11B, since the rear end of the index sheet S is straight, if the sheet detection sensors 103a, 103b, and 103c are arranged at regular intervals, |Δta| is equal to |Δtb|. Here, |Δta| is used as the selected rear-end detection time. Then, the control unit 1a controls the conveyance speeds of the skew correction rollers 101a and 101b according to the selected rear-end detection time Δta to correct the skew of the index sheet S. In this case, since the skew correction is performed as mentioned above according to the front end detection, the selected rear-end detection time Δte is extremely small. Therefore, when the control unit 1a corrects the skew according to the selected rear-end detection time Δte, the skew of the index sheet is corrected completely.

When the sheet conveyance device conveys the index sheet S shown in FIG. 11C, the index part 1001 is detected by the sheet detection sensors 103a (SNS1) and 103b (SNS2). Although the index sheet S skews so that the upper part in the drawing precedes slightly, the projection dimension d of the index part 1001 is large as compared with a skew amount as mentioned above. Therefore, the rear end of the index sheet S is detected by the sheet detection sensor 103c first. When detecting the rear end of the index sheet S, the sheet detection sensor 103c gives a third sheet detection signal (H level) to the control unit 1a.

Then, the sheet detection sensor 103a detects the rear end of the index part 1001, and gives a first sheet detection signal (H level) to the control unit 1a. Finally, the sheet detection sensor 103b detects the rear end of the index part 1001, and gives a second sheet detection signal (H level) to the control unit 1a.

As shown in FIG. 11D, the times Δta, Δtb, and Δtc are defined as Δta=t1−t2, Δtb=t2−t3, and Δtc=t3−t1, respectively. The control unit 1a computes the above-mentioned values Δta, Δtb, and Δtc (i.e., computes three sets of rear-end detection times), and compares their absolute values |Δta|, |Δtb|, and |Δtc|. In the example shown in FIG. 11D, since an inequality |Δta|<|Δtb|<|Δtc| is satisfied, the control unit 1*a* controls the conveyance speeds of the skew correction rollers 101*a* and 101*b* according to the detection time (the selected rear-end detection time) Δta so as to correct the skew of the index sheet S.

FIG. 12 is a flowchart showing a skew detection-correction process that is performed by the skew correction unit 1 according to the second embodiment of the present invention. It should be noted that the following description assumes that the index sheet S is conveyed in the state shown in FIG. 10A and FIG. 11A.

When a user operates to start printing via the operation-display unit 4, the controller 3 controls the printer control unit 2 to perform the print operation as mentioned above. In this case, a sheet is conveyed from the sheet cassette as mentioned above, and the controller 3 starts the skew correction control for a sheet. When starting the skew correction control, the controller 3 reads sheet characteristics (a sheet type, a sheet shape, etc.) that is selected by the user from the sheet information storage unit 8, and gives them to the printer control unit 2. Then, the printer control unit 2 gives the sheet characteristics to the control unit 1*a*, together with a skew correction control start signal.

When receiving the skew correction control start signal, the control unit 1*a* checks whether any one of the sheet detection sensors 103*a* (SNS1), 103*b* (SNS2), and 103*c* (SNS3) detected the sheet front end (S1201). When any one of the sheet detection sensors 103*a*, 103*b*, and 103*c* (the sheet detection sensor 103*a* in this case) detects a sheet front end (YES in S1201), the control unit 1*a* starts a built-in front-end skew detection timer in order to measure the detection time (S1202).

Subsequently, when the sheet detection sensor 103*b* detects the sheet front end, the control unit 1*a* reads the measured time of the front-end skew detection timer and computes the detection time Δta as mentioned above. Then, the control unit 1*a* checks whether all the sheet detection sensors 103*a*, 103*b*, and 103*c* detected the sheet front end (turned ON) (S1203). When all the sheet detection sensors 103*a*, 103*b*, and 103*c* detect the sheet front end (YES in S1203), the control unit 1*a* suspends the time measurement of the front-end skew detection timer. Then, the control unit 1*a* computes the detection times Δtb and Δtc as described in FIG. 10B (S1204).

Subsequently, the control unit 1*a* selects the detection time with the smallest absolute value among the detection times Δta, Δtb, and Δtc as the selected front-end detection time Δt. Here, the selected front-end detection time Δt is equal to the detection time Δta. Then, the control unit 1*a* computes a skew amount (a front-end skew amount) according to the selected front-end detection time Δt (S1205), and computes the correction time ts described in FIG. 3B based on the above-mentioned equation (1) as a front-end correction time (S1206).

Thus, after computing the front-end correction time ts, the control unit 1*a* corrects the skew of the sheet by changing the conveyance speed of the skew correction roller 101*a* or 101*b* from the speed V0 to the speed Vs during the front-end correction time ts (S1207).

Subsequently, the skew correction drive control unit 1*a* checks whether one of the sheet detection sensors 103*a* (SNS1), 103*b* (SNS2), and 103*c* (SNS3) turned off (S1208). When any one of the sheet detection sensors 103*a*, 103*b*, and 103*c* (the sheet detection sensor 103*a* in this example) turns OFF (YES in S1208), the control unit 1*a* starts a built-in rear-end skew detection timer (not shown) (S1209).

Subsequently, when the sheet detection sensor 103*b* detects the sheet rear end (i.e., turns off), the control unit 1*a* reads the measured time of the rear-end skew detection timer and computes the rear-end detection time Δta as mentioned above. Then, the control unit 1*a* checks whether all the sheet sensors 103*a*, 103*b*, and 103*c* are OFF (S1210).

When all the sheet detection sensors 103*a*, 103*b*, and 103*c* turned OFF (YES in S1210), the control unit 1*a* suspends the measurement of the rear-end skew detection timer. The control unit 1*a* computes the rear-end detection times Δtb and Δtc (S1211) as described in FIG. 11B. Subsequently, the skew correction drive control unit 1*a* selects the rear-end detection time with the smallest absolute value among the rear-end detection times Δta, Δtb, and Δtc as the selected rear-end detection time Δte. Here, the selected rear-end detection time Δte is equal to the rear-end detection time Δta. The control unit 1*a* computes a rear-end skew amount according to the selected rear-end detection time Δte (S1212).

Next, the control unit 1*a* determines whether the rear-end skew amount Δte is smaller than a skew threshold value te specified beforehand (S1213). Then, when the rear-end skew amount Δte is smaller than the skew threshold value te (YES in S1213), the control unit 1*a* finishes the skew correction control, and notifies the printer control unit 2 about that. When it is determined that the rear-end skew amount Δte is equal to or larger than the skew threshold value (NO in S1213), the control unit 1*a* determines whether the rear-end skew amount Δte exceeds a correction upper limit tf (S1214). When the rear-end skew amount Δte does not exceed the correction upper limit tf, the control unit 1*a* computes the correction time (the rear-end correction time) ts according to the rear-end skew amount Δte as mentioned above (S1215). Then, the control unit 1*a* corrects the skew of the sheet by changing the conveyance speed of the skew correction roller 101*a* or 101*b* from the speed V0 to the speed Vs during the rear-end correction time ts (S1216). Then, the control unit 1*a* finishes the skew correction control.

When the rear-end skew amount Δte exceeds the correction upper limit, the control unit 1*a* notifies the printer control unit 2 of a skew correction error (S1217). When receiving the skew correction error, the printer control unit 2 notifies the controller 3 that the rear-end skew amount exceeds the upper limit, and the controller 3 displays the skew correction error on the operation-display unit 4. In this case, when a printing start operation is performed by the client PC 14-1 or 14-2, the controller 3 notifies the client PC14-1 or 14-2 of the error concerned.

Also in the second embodiment, when sheet detection sensors 113*a*, 113*b*, and 113*c* (fourth, fifth, and sixth sensors) are arranged independently so as to detect a rear end of a sheet, the sheet detection sensors 103*a*, 103*b*, and 103*c* detect only a front end of the sheet.

Still further in the second embodiment, when a plurality of skew correction mechanisms (skew correction rollers etc.) are arranged to correct skew, flexibility in the parts arrangement of the skew correction unit and the circumference can be increased, which can respond to a higher conveyance speed and can increase accuracy of the skew correction operation.

Thus, the second embodiment is able to correct the skew of the index sheet not only when the index sheet S has the wide index part 1001 but also when the index sheet S has the narrow index part 701 as shown in FIG. 7A, with a simple configuration.

Incidentally, the control unit 1*a* uses the skew correction by the first embodiment or the second embodiment according to the setting via the operation-display unit 4. That is, when starting the skew correction control, the controller 3 gives the sheet characteristics (a sheet type, a sheet shape, etc.) that is selected by the user to the control unit 1 via the printer control unit 2. When an index sheet is conveyed, the control unit 1*a* uses the skew correction control by the first embodiment or the second embodiment according to the sheet characteristic. For example, the control unit 1*a* uses the skew correction control by the first embodiment or the second embodiment according to the arrangement intervals among the three sheet detection sensors 103*a*, 103*b*, and 103*c*, and the width of the index part. That is, when the width of the index part is smaller than the arrangement interval between the sheet detection sensors, the skew correction control by the first embodiment is executed, and when the width of the index part is equal to or larger than the arrangement interval between the sheet detection sensors, the skew correction control by the second embodiment is executed.

When the arrangement interval of the sheet detection sensors is 90 mm and the skew upper limit is about ±3 mm as described in the first embodiment, the skew of the index sheet that has the narrow index part as shown in the first embodiment can be corrected based on the detection time with the smallest absolute value among the detection times $\Delta$ta, $\Delta$tb, and $\Delta$tc. In this case, the second embodiment is applicable to both of the index sheet with the narrow index part and the index sheet with the wide index part.

When there is no index part in a front end in the conveyance direction, the skew is corrected by detecting the front end according to a method similar to the method described in FIG. 11B. It is necessary to have at least three sheet detection sensors, and the front-end detection time or the rear-end detection time as mentioned above may be selected according to the detection results of these sheet detection sensors. Then, since the accuracy of the skew correction improves as the number of the sheet detection sensors increases, the number of the sheet detection sensors may be determined in consideration of a cost.

Figure 14:
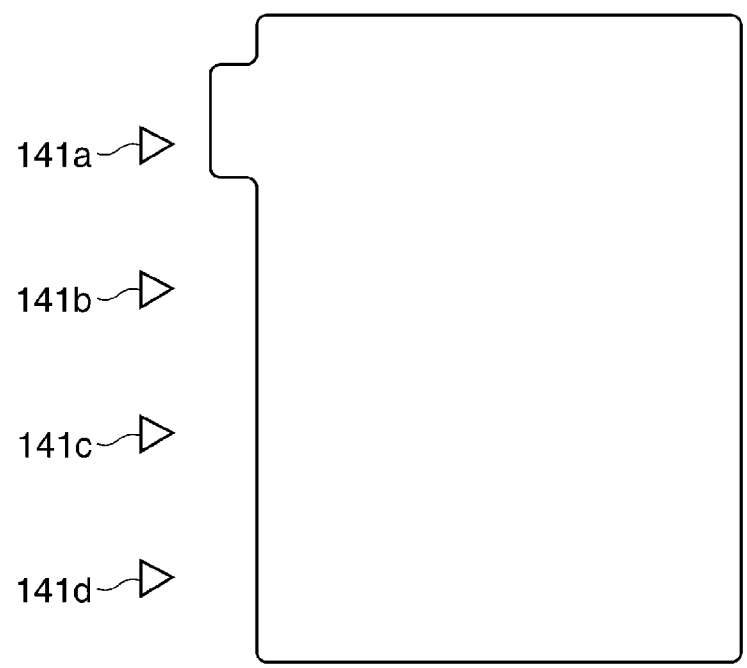
FIG. 14 is a view showing a positional relationship between the sensors and the sheet in another modification of the second embodiment.

For example, when four sheet detection sensors 141*a*, 141*b*, 141*c*, and 141*d* are arranged in the direction intersecting the conveyance direction so that only one sensor detects the index part as shown in FIG. 14, the method described in the first embodiment is applicable. Namely, the skew amount can be computed based on the outputs of the sheet detection sensors that detected the sheet secondary and thirdly, without using the output of the sheet detection sensor that detected the sheet first. It should be noted that the skew amount may be computed based on the outputs of the sheet detection sensors that detect the sheet secondly and fourthly or the outputs of the sheet detection sensors that detect the sheet thirdly and fourthly. Regarding the rear end, the skew amount may be detected by the rear end detection based on the outputs of the sheet detection sensors that detect the sheet first and secondly. It should be noted that the skew amount may be computed based on the outputs of the sheet detection sensors that detect the sheet first and thirdly or the outputs of the sheet detection sensors that detect the sheet secondly and thirdly.

The method described in the second embodiment is applicable to the index sheet of which the index part is detected by adjacent sheet detection sensors. Namely, the skew amount can be computed based on the detection time difference with the smallest absolute value among the detection time differences of two adjacent sensors among four sheet detection sensors.

Although the above-mentioned embodiments described the image forming apparatus provided with the sheet conveyance device, the above-mentioned sheet conveyance device may be used in an image reading apparatus. That is, the image reading apparatus will have the above-mentioned sheet conveyance device, an original tray on which an original as a sheet is arranged, and a scanner for reading an image of an original that is conveyed to an original reading position from the original tray by the sheet conveyance device in order to obtain image data. In FIG. 1, the control unit 1*a* functions as a skew-amount computation unit, a speed change unit, and a notification unit as clarified by the above-mentioned description.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-027151, filed on Feb. 10, 2011, and No. 2012-016618, filed on Jan. 30, 2012, which are hereby incorporated by reference herein in its entirety.

What is claimed is:

1. A sheet conveyance device comprising:
   a plurality of conveyance units configured to be arranged in a direction intersecting a sheet conveyance direction to convey a sheet, said conveyance units being driven independently;
   at least three detection sensors configured to be arranged in a direction intersecting the sheet conveyance direction at an upstream side from said conveyance units in the sheet conveyance direction to detect the sheet;
   a skew amount computation unit configured to measure a time difference between detection timings of a front end of the sheet by two of said at least three detection sensors except the detection sensor that detects the front end of the sheet first as a front-end detection time, and to compute a skew amount of the sheet as a front-end skew amount according to the front-end detection time; and
   a speed change unit configured to make the conveyance speeds of said conveyance units be different according to the front-end skew amount so as to correct the skew of the sheet.

2. The sheet conveyance device according to claim 1, wherein said skew amount computation unit measures a time difference between detection timings of a rear end of the sheet by two of said at least three detection sensors except the detection sensor that detects the rear end of the sheet finally as a rear-end detection time, and to compute a skew amount of the sheet as a rear-end skew amount according to the rear-end detection time, and
   wherein said speed change unit makes the conveyance speeds of said conveyance units be different according to the rear-end skew amount.

3. The sheet conveyance device according to claim 2, wherein said speed change unit corrects the skew when the rear-end skew amount is equal to or larger than a first threshold value specified beforehand.

4. The sheet conveyance device according to claim 3, further comprising a notification unit configured to notify of skew correction error when the rear-end skew amount is equal to or larger than a second threshold value specified beforehand which is larger than the first threshold.

5. The sheet conveyance device according to claim 1, wherein said skew amount computation unit measures the front-end detection time based on the detection timings of the front end of the sheet by said two of said at least three detection sensors, when an index sheet having an index part projected in the sheet conveyance direction is conveyed, if a dimension of the index part in the direction intersecting the sheet conveyance direction is smaller than an arrangement interval of said at least three detection sensors.

6. The sheet conveyance device according to claim 5, wherein said skew amount computation unit computes a plurality of front-end detection times by measuring a time difference between detection timings of the front end of the sheet for every combination of two of said at least three detection sensors, and computes the skew amount based on the smallest front-end detection time among the plurality of front-end detection times as the front-end skew amount, if the dimension of the index part in the direction intersecting the sheet conveyance direction is equal to or larger than the arrangement interval of said at least three detection sensors.

7. A sheet conveyance device comprising:
a plurality of conveyance units configured to be arranged in a direction intersecting a sheet conveyance direction to convey a sheet;
at least three detection sensors configured to be arranged in a direction intersecting the sheet conveyance direction at an upstream side from said conveyance units in the sheet conveyance direction to detect the sheet;
a skew amount computation unit configured to compute a plurality of front-end detection times by measuring a time difference between detection timings of the front end of the sheet for every combination of two of said at least three detection sensors, and to compute a skew amount of the sheet based on the smallest front-end detection time among the front-end detection times as a front-end skew amount; and
a speed change unit configured to make the conveyance speeds of said conveyance units be different according to the front-end skew amount so as to correct the skew of the sheet.

8. The sheet conveyance device according to claim 7, wherein said skew amount computation unit computes a plurality of rear-end detection times by measuring a time difference between detection timings of the rear end of the sheet for every combination of two of said at least three detection sensors, and computes the skew amount based on the smallest rear-end detection time among the front-end detection times as the rear-end skew amount, and
wherein said speed change unit makes the conveyance speeds of said conveyance units be different according to the rear-end skew amount.

9. The sheet conveyance device according to claim 8, wherein said speed change unit corrects the skew when the rear-end skew amount is equal to or larger than a threshold value specified beforehand.

10. The sheet conveyance device according to claim 9, further comprising a notification unit configured to notify of skew correction error when the rear-end skew amount is equal to or larger than the threshold value.

11. An image reading apparatus comprising:
a sheet conveyance device that includes a plurality of conveyance units configured to be arranged in a direction intersecting a sheet conveyance direction to convey a sheet, said conveyance units being driven independently, at least three detection sensors configured to be arranged in a direction intersecting the sheet conveyance direction at an upstream side from said conveyance units in the sheet conveyance direction to detect the sheet, a skew amount computation unit configured to measure a time difference between detection timings of a front end of the sheet by two of said at least three detection sensors except the detection sensor that detects the front end of the sheet first as a front-end detection time, and to compute a skew amount of the sheet as a front-end skew amount according to the front-end detection time, and a speed change unit configured to make the conveyance speeds of said conveyance units be different according to the front-end skew amount so as to correct the skew of the sheet;
an original tray on which an original as a sheet is arranged; and
a scanner configured to read an image of an original that is conveyed to an original reading position from said original tray by said sheet conveyance device in order to obtain image data.

12. An image forming apparatus comprising:
a sheet conveyance device that includes a plurality of conveyance units configured to be arranged in a direction intersecting a sheet conveyance direction to convey a sheet, said conveyance units being driven independently, at least three detection sensors configured to be arranged in a direction intersecting the sheet conveyance direction at an upstream side from said conveyance units in the sheet conveyance direction to detect the sheet, a skew amount computation unit configured to measure a time difference between detection timings of a front end of the sheet by two of said at least three detection sensors except the detection sensor that detects the front end of the sheet first as a front-end detection time, and to compute a skew amount of the sheet as a front-end skew amount according to the front-end detection time, and a speed change unit configured to make the conveyance speeds of said conveyance units be different according to the front-end skew amount so as to correct the skew of the sheet;
a sheet storage in which a sheet is stored;
a transfer unit configured to transfer a toner image, which is formed according to image data, onto the sheet conveyed to an image transfer position from said sheet storage by said sheet conveyance device.

13. An image reading apparatus comprising:
a sheet conveyance device including a plurality of conveyance units configured to be arranged in a direction intersecting a sheet conveyance direction to convey a sheet, at least three detection sensors configured to be arranged in a direction intersecting the sheet conveyance direction at an upstream side from said conveyance units in the sheet conveyance direction to detect the sheet, a skew amount computation unit configured to compute a plurality of front-end detection times by measuring a time difference between detection timings of the front end of the sheet for every combination of two of said at least three detection sensors, and to compute a skew amount of the sheet based on the smallest front-end detection time among the front-end detection times as a front-end skew amount, and a speed change unit configured to make the conveyance speeds of said conveyance units be different according to the front-end skew amount so as to correct the skew of the sheet;

an original tray on which an original as a sheet is arranged; and a scanner configured to read an image of an original that is conveyed to an original reading position from said original tray by said sheet conveyance device in order to obtain image data.

14. An image forming apparatus comprising:

a sheet conveyance device including a plurality of conveyance units configured to be arranged in a direction intersecting a sheet conveyance direction to convey a sheet, at least three detection sensors configured to be arranged in a direction intersecting the sheet conveyance direction at an upstream side from said conveyance units in the sheet conveyance direction to detect the sheet, a skew amount computation unit configured to compute a plurality of front-end detection times by measuring a time difference between detection timings of the front end of the sheet for every combination of two of said at least three detection sensors, and to compute a skew amount of the sheet based on the smallest front-end detection time among the front-end detection times as a front-end skew amount, and a speed change unit configured to make the conveyance speeds of said conveyance units be different according to the front-end skew amount so as to correct the skew of the sheet;

a sheet storage in which a sheet is stored;

a transfer unit configured to transfer a toner image, which is formed according to image data, onto the sheet conveyed to an image transfer position from said sheet storage by said sheet conveyance device.

* * * * *